US012062871B2

(12) United States Patent
Tanaka

(10) Patent No.: US 12,062,871 B2
(45) Date of Patent: Aug. 13, 2024

(54) ELECTRICAL CONNECTOR AND ELECTRONIC DEVICE

(71) Applicant: Tetsuya Tanaka, Tokyo (JP)

(72) Inventor: Tetsuya Tanaka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/485,243

(22) Filed: Oct. 11, 2023

(65) Prior Publication Data

US 2024/0039214 A1 Feb. 1, 2024

Related U.S. Application Data

(63) Continuation of application No. 17/318,941, filed on May 12, 2021, now Pat. No. 11,824,310, which is a (Continued)

(30) Foreign Application Priority Data

Oct. 30, 2018 (JP) ................................ 2018-204119
Apr. 8, 2019 (JP) ................................ 2019-073416

(51) Int. Cl.
*H01R 13/6471* (2011.01)
*H01R 13/405* (2006.01)

(52) U.S. Cl.
CPC ....... *H01R 13/6471* (2013.01); *H01R 13/405* (2013.01)

(58) Field of Classification Search
CPC .......................... H01R 24/60; H01R 13/6585; H01R 2107/00; H01R 12/724; H01R 13/6594;
(Continued)

(56) References Cited

U.S. PATENT DOCUMENTS 9,437,980 B2 9/2016 Ueda et al.
9,985,393 B2 5/2018 Zhao et al.
(Continued)

FOREIGN PATENT DOCUMENTS

JP H0557777 A 3/1993
JP 2003036951 A 2/2003
(Continued)

OTHER PUBLICATIONS

Japan Patent Office, Office Action Issued in Application No. 2018-204119, Jan. 4, 2019, 10 pages. (Submitted with Machine Translation).

*Primary Examiner* — Khiem M Nguyen
(74) *Attorney, Agent, or Firm* — McCoy Russell LLP

(57) ABSTRACT

An electrical connector contains a plurality of contacts, a first ground plate and a second ground plate facing the plurality of contacts and arranged so as to be separated from each other in a ground plane parallel to the at least one plane in which the plurality of contacts are arranged and an insulator for holding the plurality of contacts, the first ground plate and the second ground plate in a state that the plurality of contacts, the first ground plate and the second ground plate are insulated from each other. Both of the first ground plate and the second ground plate include an extending portion extending from one of the first ground plate and the second ground plate toward the other one of the first ground plate and the second ground plate in the ground plane.

6 Claims, 14 Drawing Sheets

Related U.S. Application Data continuation of application No. 16/669,481, filed on Oct. 30, 2019, now Pat. No. 11,056,832.

(58) Field of Classification Search

CPC .............. H01R 13/6581; H01R 13/405; H01R 13/6596; H01R 13/6591; H01R 13/6597; H01R 12/00; H01R 12/707; H01R 13/6471; H01R 12/712; H01R 12/716; H01R 13/506; H01R 13/516; H01R 13/6461; H01R 13/6477; H01R 13/652; H01R 13/6583; H01R 24/00; H01R 24/78; H01R 43/18; H01R 43/24; H01R 12/58; H01R 13/20; H01R 13/428; H01R 13/5202; H01R 13/6273; H01R 13/631; H01R 13/639; H01R 13/646; H01R 13/6476; H01R 13/6485; H01R 13/6582; H01R 13/6587; H01R 13/6658; H01R 24/28; H01R 24/64; H01R 9/03

USPC ..................................................... 439/607.09

See application file for complete search history.

(56) References Cited

U.S. PATENT DOCUMENTS

| | | | | |
|---|---|---|---|---|
| 10,199,777 | B2 | 2/2019 | Zhao | |
| 10,211,574 | B2 | 2/2019 | Zhao | |
| 10,276,983 | B2 | 4/2019 | Arai et al. | |
| 11,056,832 | B2 | 7/2021 | Tanaka | |
| 11,824,310 | B2 * | 11/2023 | Tanaka ................. | H01R 13/405 |
| 2011/0177721 | A1 | 7/2011 | Yotsutani | |
| 2016/0013599 | A1 | 1/2016 | Ueda et al. | |
| 2016/0021751 | A1 | 1/2016 | Andoh et al. | |
| 2018/0151987 | A1 | 5/2018 | Zhao | |

FOREIGN PATENT DOCUMENTS

| | | | |
|---|---|---|---|
| JP | 2011150890 | A | 8/2011 |
| JP | 2014175134 | A | 9/2014 |
| JP | 2016018674 | A | 2/2016 |
| JP | 2017098052 | A | 6/2017 |
| JP | 2017530534 | A | 10/2017 |
| WO | 2016053713 | A1 | 4/2016 |

* cited by examiner

ELECTRICAL CONNECTOR AND ELECTRONIC DEVICE

CROSS-REFERENCE TO RELATED APPLICATIONS AND PRIORITY

The present application is a continuation of U.S. patent application Ser. No. 17/318,941, entitled "ELECTRICAL CONNECTOR AND ELECTRONIC DEVICE", filed on May 12, 2021. U.S. patent application Ser. No. 17/318,941 is a continuation of U.S. patent application Ser. No. 16/669,481, entitled "ELECTRICAL CONNECTOR AND ELECTRONIC DEVICE", filed on Oct. 30, 2019. U.S. patent application Ser. No. 16/669,481 claims priority to Japanese Patent Application No. 2019-73416 filed on Apr. 8, 2019, and Japanese Patent Application No. 2018-204119 filed on Oct. 30, 2018. The entire contents of each of the above-listed applications are hereby incorporated by reference for all purposes.

FIELD OF THE INVENTION

The present invention generally relates to electrical connectors and electronic devices containing the electrical connectors, in particular to an electrical connector which can suppress a crosstalk between two high frequency signal contact pairs arranged in one plane through a ground plate as well as prevent occurrence of warpage and bending of an internal structure and an electronic device containing the electrical connector.

BACKGROUND ART

Generally, an electrical connector has been used for electrically connecting an electronic device and another electric device. In order to obtain an electrical connection between the electronic device and the other electronic device, a combination of two kinds of electrical connectors containing a receptacle connector which is mounted on an circuit board provided in a housing of the electric device and whose insertion port is exposed to outside through a through-hole formed in the housing of the electric device and a plug connector to be inserted into the insertion port of the receptacle connector are use.

Further, as the electronic device has downsized in recent years, needs of downsizing with respect the electrical connector have been growing. In order to meet such needs of downsizing with respect to the electrical connector, a USB Type-C standard has been proposed. An electrical connector complying with the USB Type-C standard employs a vertically symmetric design and thus it is possible to insert the plug connector into the receptacle connector regardless of vertical directions of the connectors.

A receptacle connector complying with the USB Type-C standard contains a metallic shell and an inner structure contained in the shell. The inner structure includes a plurality of contacts respectively contacted with a plurality of contacts of a counterpart connector (plug connector), a ground plate and an insulator for holding the plurality of contacts and the ground plate in a state that the plurality of contacts and the ground plate are insulated from each other.

FIG. 1 shows an arrangement of a ground plate 800 and a plurality of contacts 810 contained in the inner structure of the receptacle connector complying with the USB Type-C standard. Further, FIG. 2 is a view obtained by viewing the ground plate 800 and the plurality of contacts 810 shown in FIG. 1 from a front side (the insertion direction side of the counterpart connector).

As shown in FIGS. 1 and 2, a first group 810U constituted of the contacts 810 arranged in one plane is provided on the upper side of the plate-like ground plate 800 formed of a metallic material. Further, a second group 810L constituted of the contacts 810 arranged on another plane is provided on the lower side of the ground plate 800.

Each of the first group 810U and the second group 810L contains two high frequency signal contact pairs CP1 each constituted of high frequency signal contacts 810A for transmitting and receiving a high frequency signal with the counterpart connector to be inserted from the tip side, a normal signal contact pair CP2 constituted of normal signal contacts 810B for transmitting and receiving a normal frequency signal with the counterpart connector and non-signal contacts 810C containing a ground contact, a power supply contact, an identification connector and the like.

In each of the first group 810U and the second group 810L, the non-signal contacts 810C are arranged on the left side and the right side of each of the two high frequency signal contact pairs CP1 and the normal signal contact pair CP2. Further, the normal signal contact pair CP2 is arranged between the two high frequency signal contact pairs CP1. Further, as shown in FIG. 2, the first group 810U and the second group 810L are vertically symmetric through the ground plate 800.

Since the receptacle connector complying with the USB Type-C standard is very small, a distance between the contacts 810 constituting the first group 810U and the contacts 810 constituting the second group 810L is short. Thus, it becomes a problem that a crosstalk occurs between the high frequency signal contact pair CP1 of the first group 810U and the high frequency signal contact pair CP1 of the second group 810L. In the receptacle connector complying with the USB Type-C standard, the ground plate 800 is arranged between the first group 810U and the second group 810L in order to suppress this crosstalk.

However, it has been found that a crosstalk between the two high frequency signal contact pairs CP1 of the first group 810U and a crosstalk between the two high frequency signal contact pairs CP1 of the second group 810L are caused by arranging the ground plate 800 close to the first group 810U and the second group 810L. When the high frequency signal flows in one of the high frequency signal contact pairs CP1 of the first group 810U or the second group 810L, the other one of the high frequency signal contact pairs CP1 is affected by the high frequency signal flowing in the one of the high frequency signal contact pairs CP1 through the ground plate 800. This results in causing the crosstalk with respect to the other one of the high frequency signal contact pairs CP1.

In order to solve the above-mentioned problem, patent document 1 discloses a concept of dividing the ground plate 800 along an insertion direction of the counterpart connector into ground plate pieces 800A, 800B, 800C as shown in FIG. 3. The ground plate piece 800A facing one of the high frequency signal contact pairs CP1 of each of the first group 810U and the second group 810L is separated from the ground plate piece 800C facing the other one of the high frequency signal contact pairs CP1 of each of the first group 810U and the second group 810L. Thus, it is possible to suppress occurrence of the crosstalk between the two high frequency signal contact pairs Cp1 of the first group 810U or the second group 810L through the ground plate 800.

However, in the case where the ground plate 800 is divided along the insertion direction of the counterpart connector into the ground plate pieces 800A, 800B, 800C as shown in FIG. 3, spaces S in which the ground plate 800 does not exist appear between the ground plate piece 800A and the ground plate piece 800B and between the ground plate piece 800C and the ground plate piece 800B when the ground plate 800 is viewed from the insertion direction of the counterpart connector. Since the ground plate 800 provides a bending stress in the plane direction in the inner structure, the bending stress of the inner structure in the plane direction in the inner structure significantly reduces in areas in which the spaces S are respectively positioned. As a result, there is a problem that warpage and bending of the inner structure are likely to occur in the areas in which the spaces S are respectively positioned.

Further, the above-mentioned spaces S in which the ground plate 800 does not exist negatively affect at the time of forming the inner structure. The insulator of the inner structure is obtained by an insert molding of injecting an insulation resin material around the ground plate 800 and the plurality of contacts 810 placed in a metal mold having a shape corresponding to a shape of the insulator to integrate the ground plate 800 and the plurality of contacts 810 with the insulation resin material. In the above-mentioned insert molding, it has been well-known that non-uniformity of cooling (uninform cooling) for the insulation resin material at the time of cooling and curing the insulation resin material causes a stress in the insulator and thereby warpage and bending of the inner structure are caused by the stress. Since the ground plate 800 is generally constituted of one metallic plate, the occurrence of the warpage and the bending of the inner structure at the time of cooling and curing the insulation resin material is prevented by the ground plate 800. However, in the case where the ground plate 800 is divided into the ground plate pieces 800A, 800B, 800C as described above, there is a problem that the warpage and the bending of the inner structure in the areas corresponding to the spaces S in which the ground plate 800 does not exist cannot be prevented.

Further, in order to prevent a positional shift and an inclination of each of the plurality of contacts 810 in the insulator, the insert molding for obtaining the inner structure is generally performed in a state that the plurality of contacts 810 are connected with each other. In this case, a tie bar cut is performed for punching connection portions connecting the plurality of contacts 810 with each other to separate the plurality of contacts 810 from each other after the insert molding completes. In order to enabling the above-mentioned tie bar cut after the insert molding, it is required to form tie bar cut holes through which the tie bar cut is performed in the ground plate 800. However, in the case where the above-mentioned tie bar cut holes are formed in the ground plate 800, the warpage and the bending of the inner structure are likely to occur in areas corresponding to the tie bar cut holes due to the above-mentioned stress caused by the non-uniformity of the cooling for the insulation resin material during the insertion molding.

If the warpage and the bending of the inner structure occur, a contact failure between the contacts of the counterpart connector and the contacts 810 of the receptacle connector is likely to occur. Thus, it is necessary to suppress the occurrence of the crosstalk between the two high frequency signal contact pairs CP1 of the first group 810U or the second group 810L through the ground plate 800 as well as prevent the occurrence of the warpage and the bending of the inner structure.

RELATED ART

Patent Document

Patent document 1: JP 2016-18674A

SUMMARY OF THE INVENTION

Problems to be Solved by the Invention

The present invention has been made in view of the conventional problems mentioned above. Accordingly, it is an object of the present invention to provide an electrical connector which can suppress the crosstalk between the two high frequency signal contact pairs of the plurality of contacts arranged on the upper side or the lower side of the ground plate as well as prevent the warpage and the bending of the inner structure and an electronic device containing the electrical connector.

Means for Solving the Problems

The above object is achieved by the present inventions defined in the following (1) to (8).

(1) An electrical connector which can fit with a counterpart connector inserted from a tip side of the electrical connector, comprising:
- a plurality of contacts arranged in at least one plane;
- a first ground plate and a second ground plate facing the plurality of contacts and arranged so as to be separated from each other in a ground plane parallel to the at least one plane in which the plurality of contacts are arranged; and
- an insulator for holding the plurality of contacts, the first ground plate and the second ground plate in a state that the plurality of contacts, the first ground plate and the second ground plate are insulated from each other,
- wherein the first ground plate includes a plate-like main body portion and a first extending portion extending from the main body portion thereof toward the second ground plate,
- wherein the second ground plate includes a plate-like main body portion and a first extending portion extending from the main body portion thereof toward the first ground plate,
- wherein the first ground plate and the second ground plate are arranged in the ground plane so that the main body portion of the first ground plate and the main body portion of second ground plate face each other through a center line of the electrical connector in a width direction of the electrical connector perpendicular to an insertion direction of the counterpart connector, and
- wherein the first extending portion of the first ground plate extends from the main body portion of the first ground plate toward the main body portion of the second ground plate over the center line of the electrical connector in the width direction of the electrical connector and the first extending portion of the second ground plate extends from the main body portion of the second ground plate toward the main body portion of the first ground plate over the center line of the electrical connector in the width direction of the electrical connector, and thereby an area in which the first extending portion of the first ground plate and the first extending portion of the second ground plate are overlapped with each other in the insertion direction of the counterpart connector is formed.

(2) The electrical connector according to the above (1), wherein the first ground plate further includes a second extending portion extending from a tip side portion of the main body portion located on the tip side than a portion of the main body portion at which the first extending portion is formed toward the second ground plate and a third extending portion extending from a base side portion of the main body portion located on a base side than the portion of the main body portion at which the first extending portion is formed toward the second ground plate, wherein the second ground plate further includes a second extending portion extending from a tip side portion of the main body portion located on the tip side than a portion of the main body portion at which the first extending portion is formed toward the first ground plate and a third extending portion extending from a base side portion of the main body portion located on the base side than the portion of the main body portion at which the first extending portion is formed toward the first ground plate, wherein the first extending portion of the first ground plate extends over a tip end portion of the second extending portion or the third extending portion of the second ground plate in the ground plane in the width direction of the electrical connector, and thereby the first extending portion of the first ground plate is overlapped with the second extending portion or the third extending portion of the second ground plate in the insertion direction of the counterpart connector, and wherein the first extending portion of the second ground plate extends over a tip end portion of the second extending portion or the third extending portion of the first ground plate in the ground plane in the width direction of the electrical connector, and thereby the first extending portion of the second ground plate is overlapped with the second extending portion or the third extending portion of the first ground plate in the insertion direction of the counterpart connector.

(3) The electrical connector according to the above (1) or (2), wherein a distance between the first ground plate and the second ground plate at a location where the first ground plate and the second ground plate approach most to each other is equal to or more than a distance between the first ground plate or the second ground plate and each of the plurality of contacts at a location where the first ground plate or the second ground plate and each of the plurality of contacts approach most to each other.

(4) The electrical connector according to any one of the above (1) to (3), wherein the area in which the first extending portion of the first ground plate and the first extending portion of the second ground plate are overlapped with each other in the insertion direction of the counterpart connector has a width of 0.25 mm or more in the width direction of the electrical connector.

(5) The electrical connector according to any one of the above (1) to (4), wherein the first ground plate and the second ground plate are arranged so that the main body portions of the first ground plate and the second ground plate are symmetric in the ground plane through the center line of the electrical connector in the width direction of the electrical connector.

(6) The electrical connector according to any one of the above (1) to (5), wherein each of the first ground plate and the second ground plate includes:

positioning holes through which positioning pins are respectively passed for positioning each of the plurality of contacts at the time of molding the insulator so that the insulator holds the plurality of contacts, the first ground plate and the second ground plate, tie bar cut holes for enabling a tie bar cut for punching connection portions of the plurality of contacts which are connected with each other by the connection portions at the time of molding the insulator to separate the plurality of contacts from each other, and impedance adjustment holes for adjusting impedances of the plurality of contacts.

(7) An electrical connector which can fit with a counterpart connector inserted from a tip side of the electrical connector, comprising:

a plurality of contacts arranged in at least one plane;

a first ground plate and a second ground plate facing the plurality of contacts and arranged so as to be separated from each other in a ground plane parallel to the at least one plane in which the plurality of contacts are arranged; and an insulator for holding the plurality of contacts, the first ground plate and the second ground plate in a state that the plurality of contacts, the first ground plate and the second ground plate are insulated from each other, wherein each of the plurality of contacts linearly extends along an insertion direction of the counterpart connector, wherein both of the first ground plate and the second ground plate have an extending portion, wherein the extending portion of the first ground plate extends toward the second ground plate in the ground plane, wherein the extending portion of the second ground plate extends toward the first ground plate in the ground plane, and wherein at least one of the plurality of contacts faces both of the extending portion of the first ground plate and the extending portion of the second ground plate.

An electronic device, comprising:

a housing;

a circuit board provided in the housing; and the electrical connector defined by any one of the above (1) to (7) and mounted on the circuit board.

Effects of the Invention

The electrical connector of the present invention contains the first ground plate and the second ground plate arranged so as to be separated from each other in the ground plane parallel to the at least one plane in which the plurality of contacts are arranged. Thus, it is possible to suppress occurrence of a crosstalk between high frequency signal contact pairs when a high frequency signal flows in one of the high frequency signal contact pairs facing one of the first ground plate and the second ground plate.

Further, both of the first ground plate and the second ground plate include the extending portion extending from one of the first ground plate and the second ground plate toward the other one of the first ground plate and the second ground plate in the ground plane. Thus, when the first ground plate and the second ground plate arranged in the ground plane are viewed from the insertion direction of the counterpart connector, the first ground plate or the second ground plate exists in all areas. As a result, it is possible to prevent the reduction of the stress in the plane direction in the inner structure constituted of the plurality of contacts, the first ground plate, the second ground plate and the insulator, thereby preventing occurrence of warpage and bending of the inner structure.

Further, the extending portions of the first ground plate and the second ground plate exist in the space between the first ground plate and the second ground plate. Thus, it is possible to suppress the occurrence of the warpage and the bending of the inner structure in the space between the first ground plate and the second ground plate, which is caused by a stress occurring when an insulation resin material is cooled and cured at the time of an insert molding for the insulator.

Further, in the electrical connector of the present invention, a space defined by the extending portions of the first ground plate and the second ground plate between the first ground plate and the second ground plate is utilized for the tie bar cut for punching the connection portions of the plurality of contacts to separate the plurality of contacts from each other. Thus, in the electrical connector of the present invention, it is possible to reduce the number of the tie bar cut holes and a size of each of the tie bar cut holes formed in the first ground plate and the second ground plate. As a result, it is possible to suppress the occurrence of the warpage and the bending of the inner structure caused by the stress occurring when the insulation resin material is cooled and cured at the time of performing the insert molding for the insulator.

DETAILED DESCRIPTION OF THE PREFERRED EMBODIMENT

Figure 1:
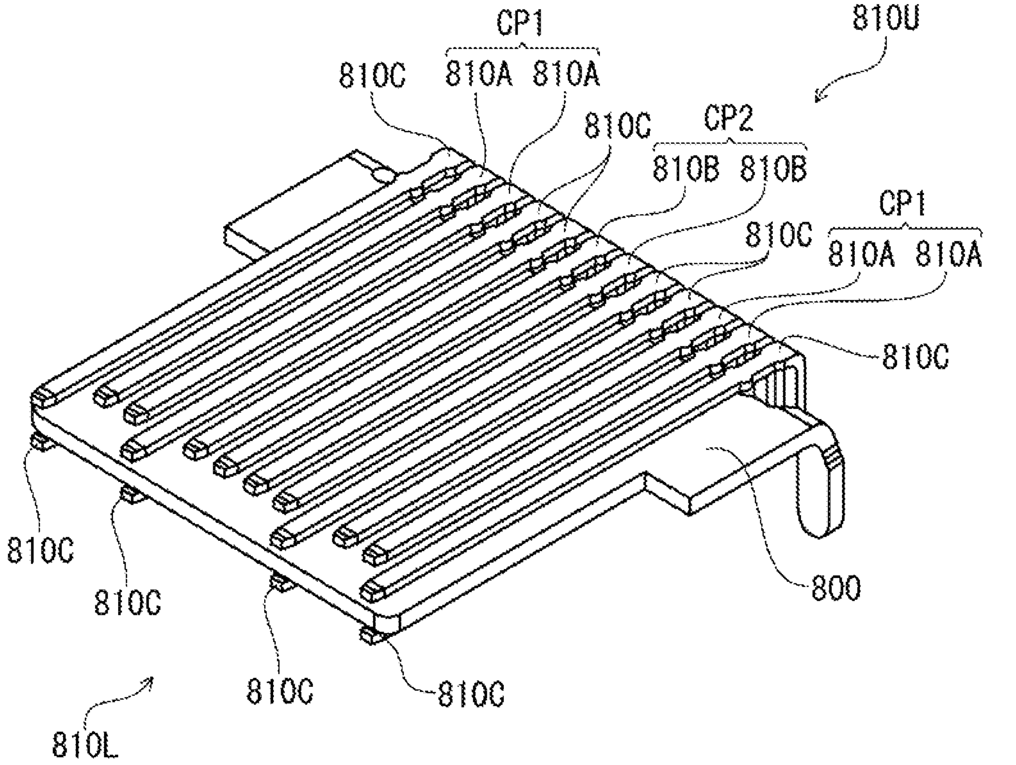
Prior Art FIG. 1
FIG. 1 is a perspective view showing an arrangement of a plurality of contacts and a ground plate of an existing electrical connector.
Figure 2:
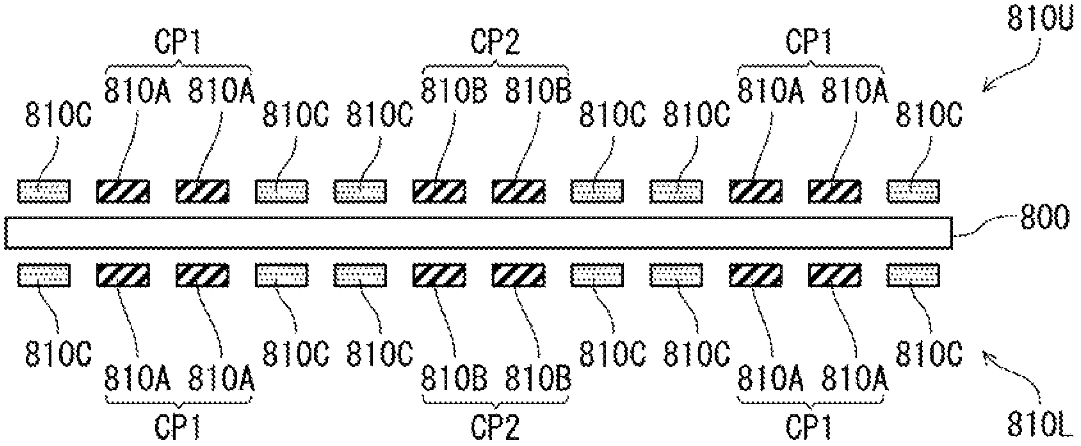
Prior Art FIG. 2
FIG. 2 is a view obtained by viewing the plurality of contacts and the ground plate shown in FIG. 1 from the front side.
Figure 3:
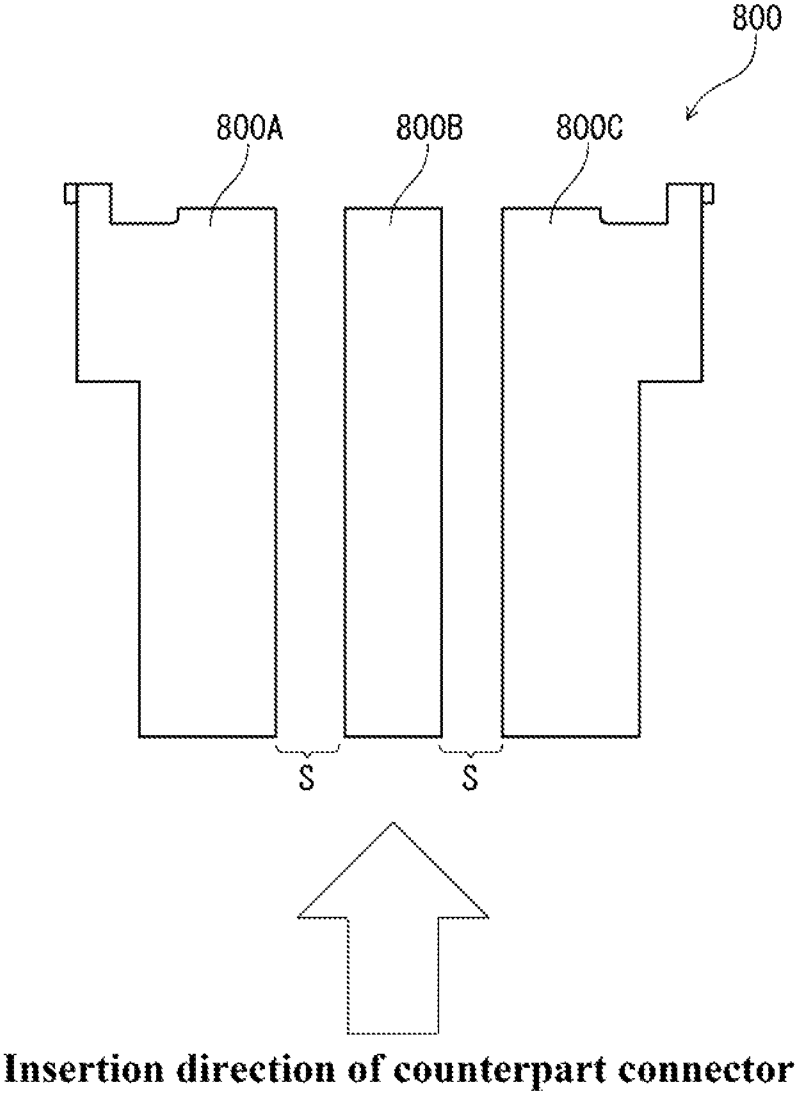
Prior Art FIG. 3
FIG. 3 is a planar view showing a ground plate of another existing electrical connector.

Hereinafter, description will be given to an electrical connector and an electronic device of the present invention based on a preferred embodiment shown in the accompanying drawings. In this regard, the drawings referenced in the following description are schematic views prepared for explaining the present invention. A dimension (such as a length, a width and a thickness) of each component shown in the drawings is not necessarily identical to an actual dimension. Further, the same reference numbers are used throughout the drawings to refer to the same or like elements. Hereinafter, a positive direction of the Z axis in the drawings is sometimes referred to as "a tip side", a negative direction of the Z axis in the drawings is sometimes referred to as "a base side", a positive direction of the Y axis in the drawings is sometimes referred to as "an upper side", a negative direction of the Y axis in the drawings is sometimes referred to as "a lower side", a positive direction of the X axis in the drawings is sometimes referred to as "a right side" and a negative direction of the X axis in the drawings is sometimes referred to as "a left side".

Figure 4:
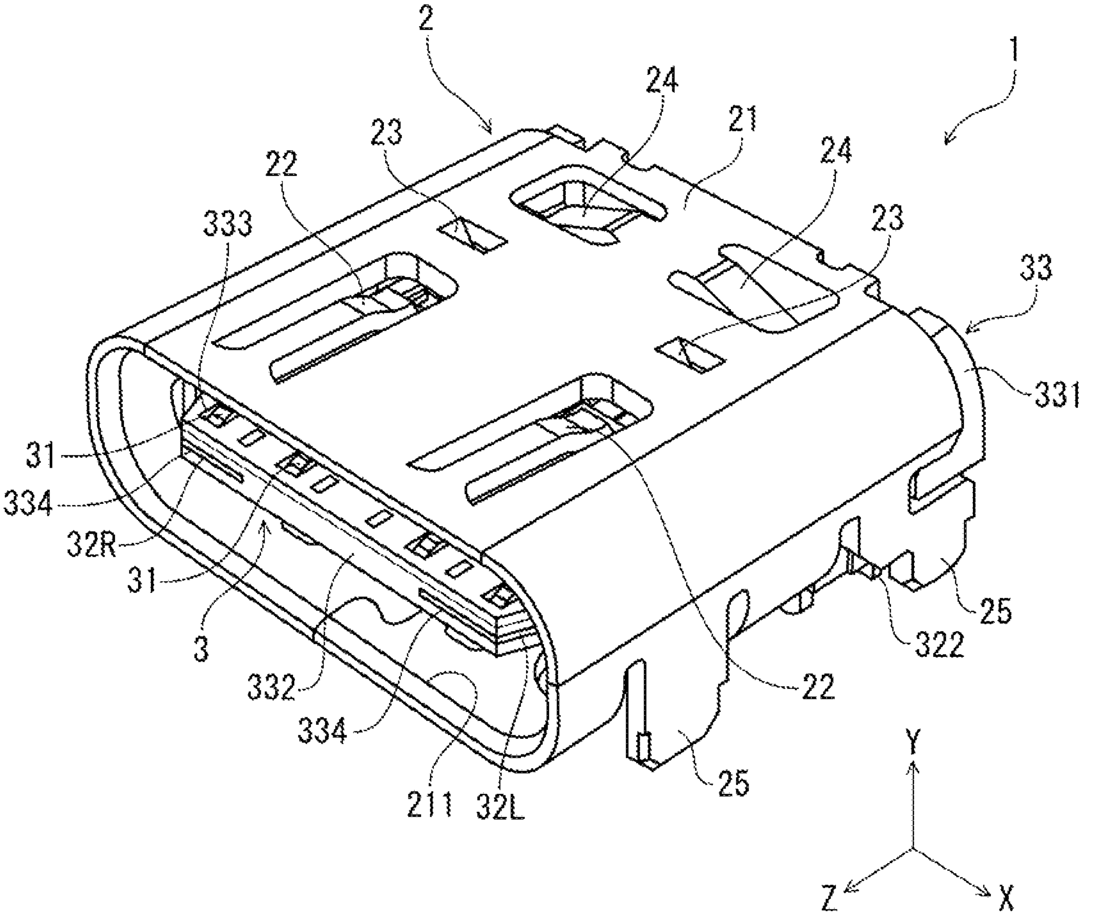
FIG. 4 is a perspective view showing an electrical connector according to an embodiment of the present invention.
Figure 5:
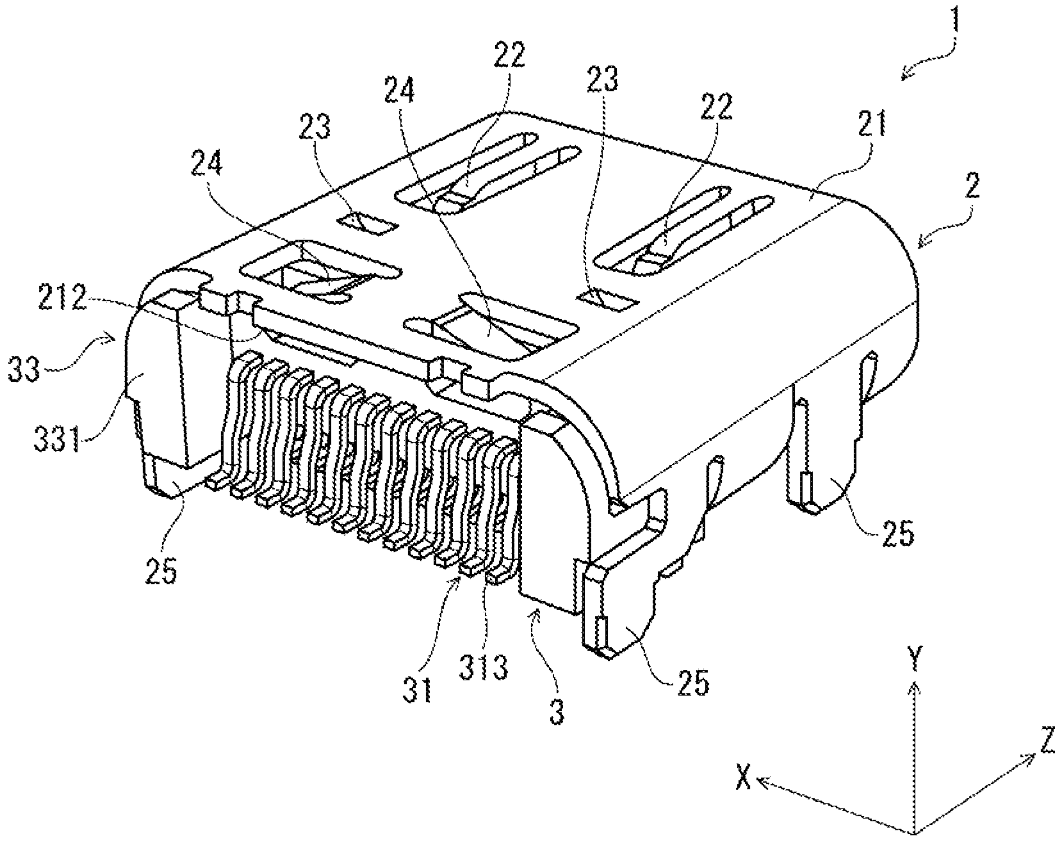
FIG. 5 is another perspective view showing the electrical connector shown in FIG. 4 viewed from another angle.
Figure 6:
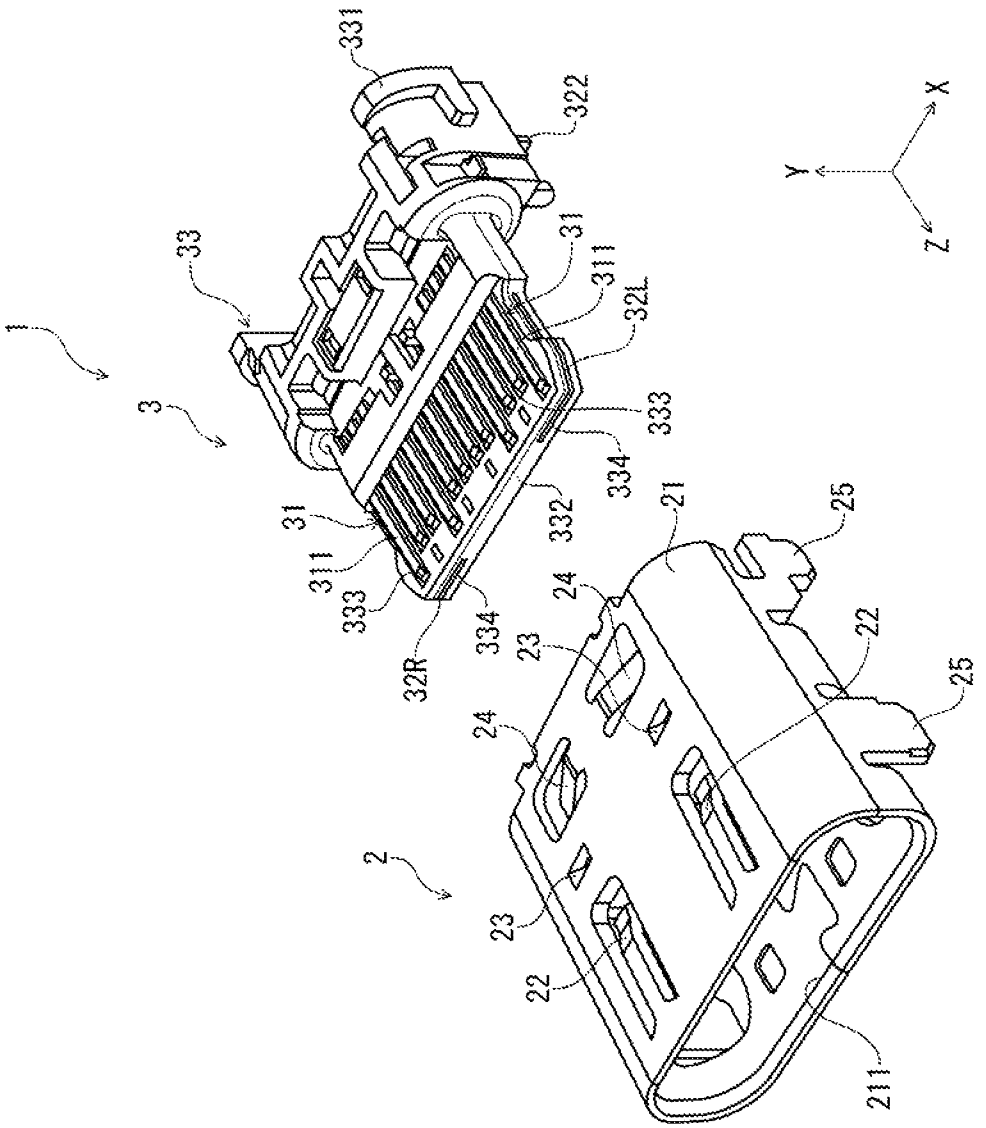
FIG. 6 is an exploded perspective view of the electrical connector shown in FIG. 4.
Figure 7:
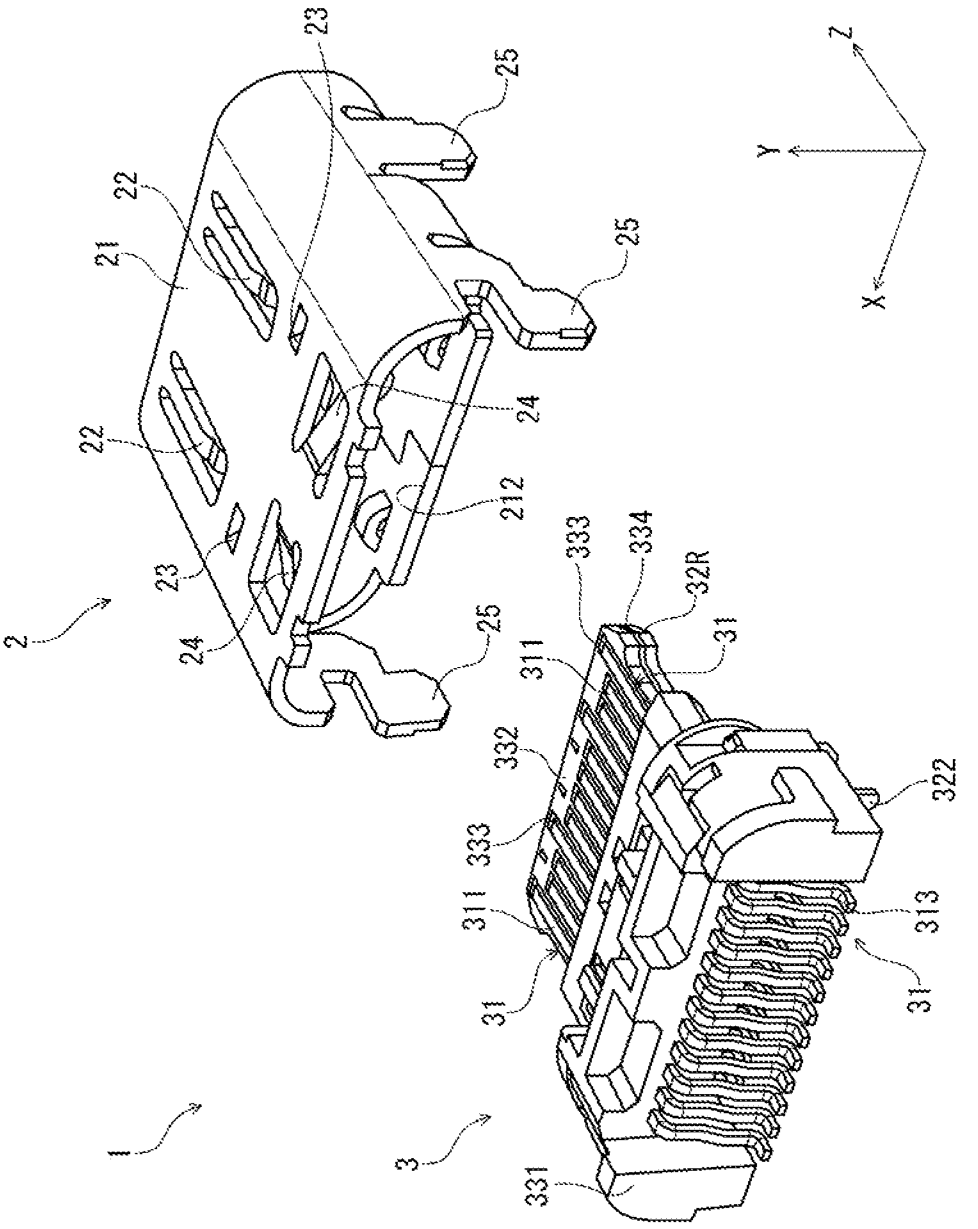
FIG. 7 is another exploded perspective view of the electrical connector shown in FIG. 4 viewed from another angle.
Figure 8:
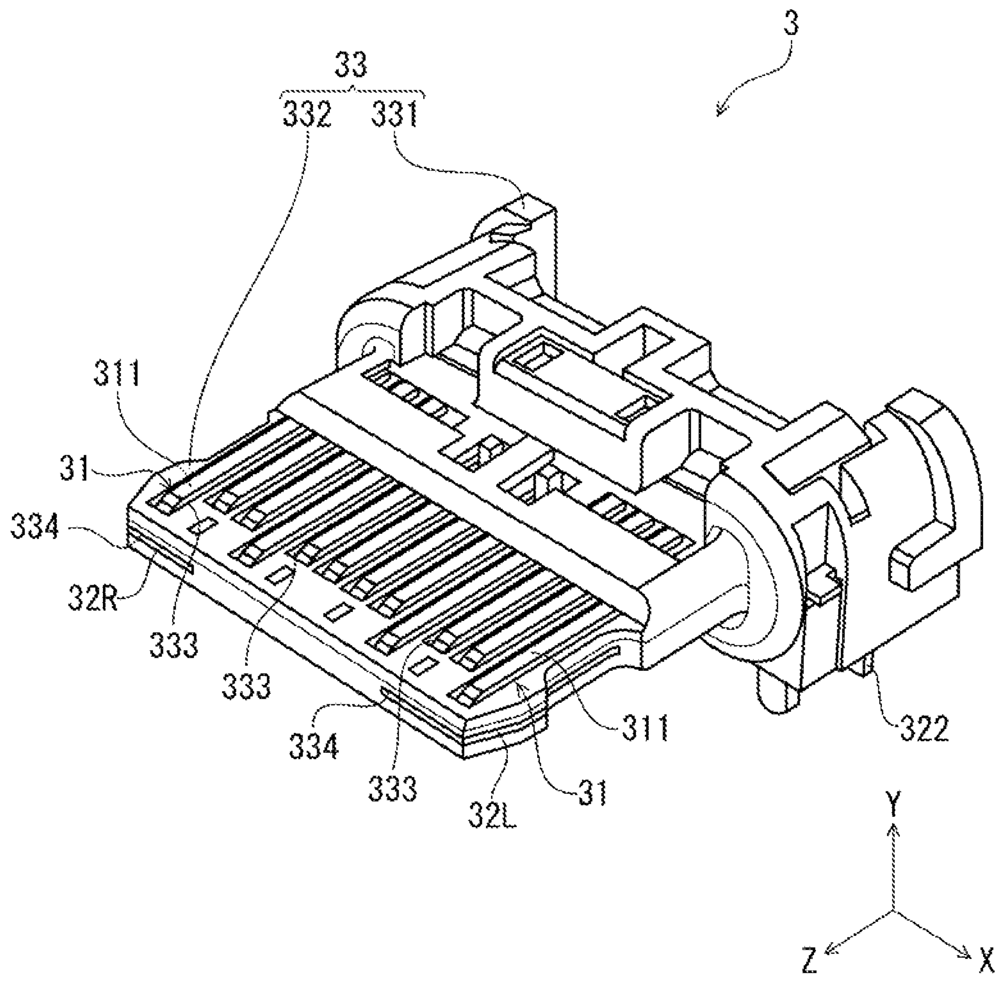
FIG. 8 is a perspective view showing an inner structure of the electrical connector shown in FIG. 4.
Figure 9:
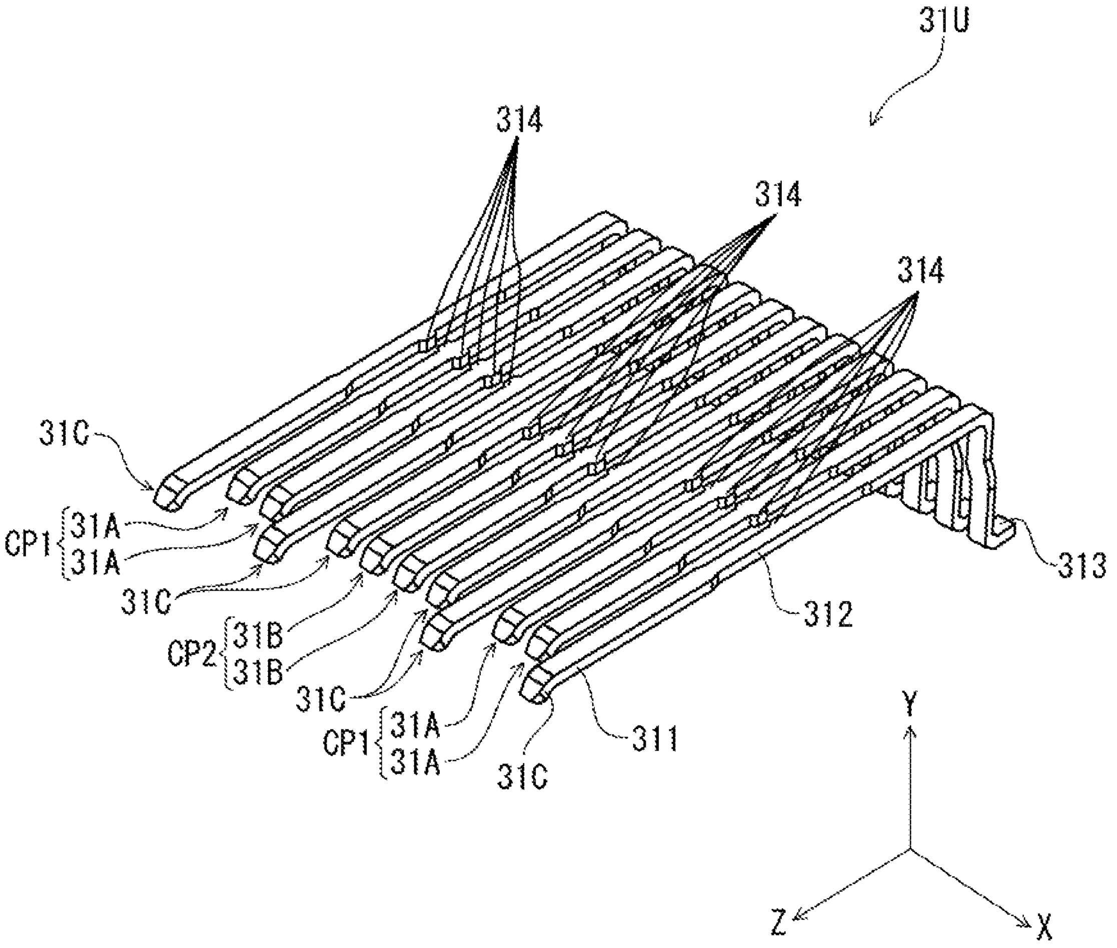
FIG. 9 is a perspective view showing a first group of a plurality of contacts contained in the inner structure shown in FIG. 8.
Figure 10:
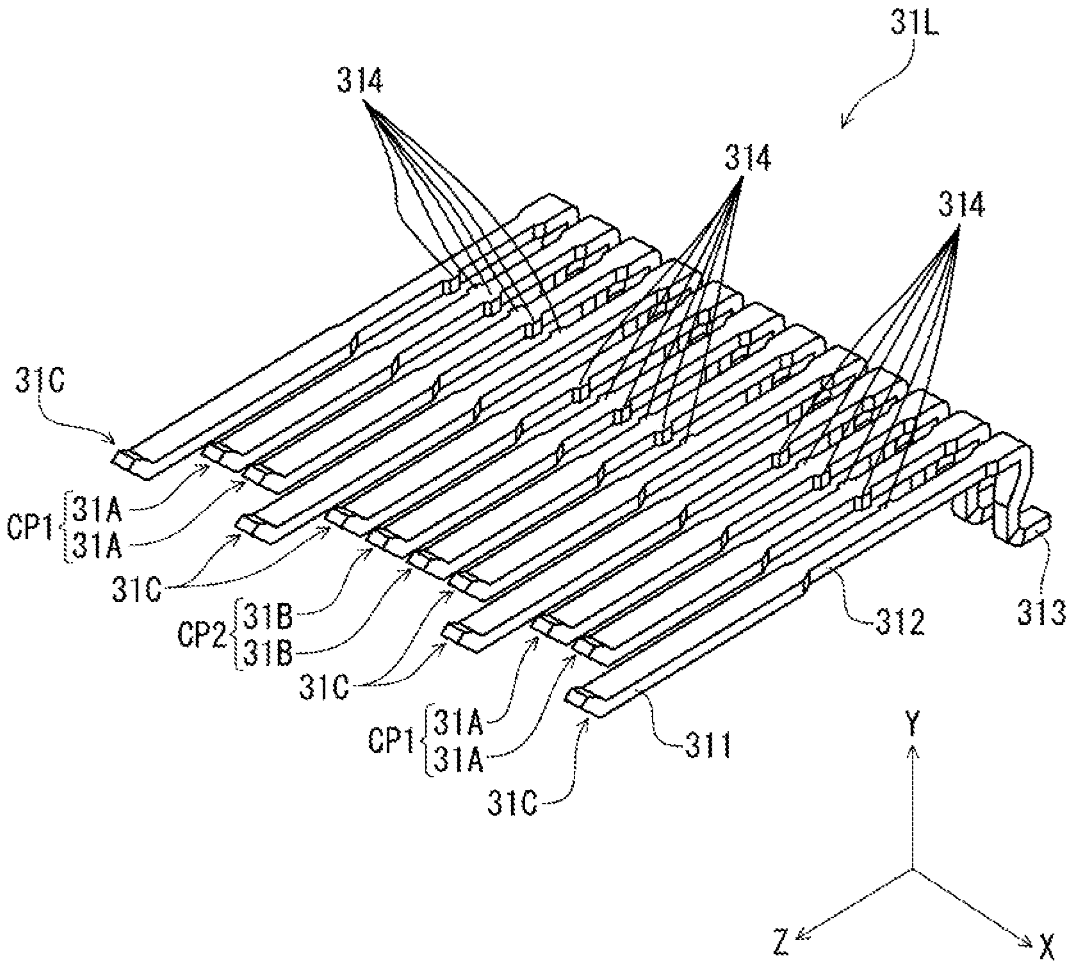
FIG. 10 is a perspective view showing a second group of the plurality of contacts contained in the inner structure shown in FIG. 8.
Figure 11:
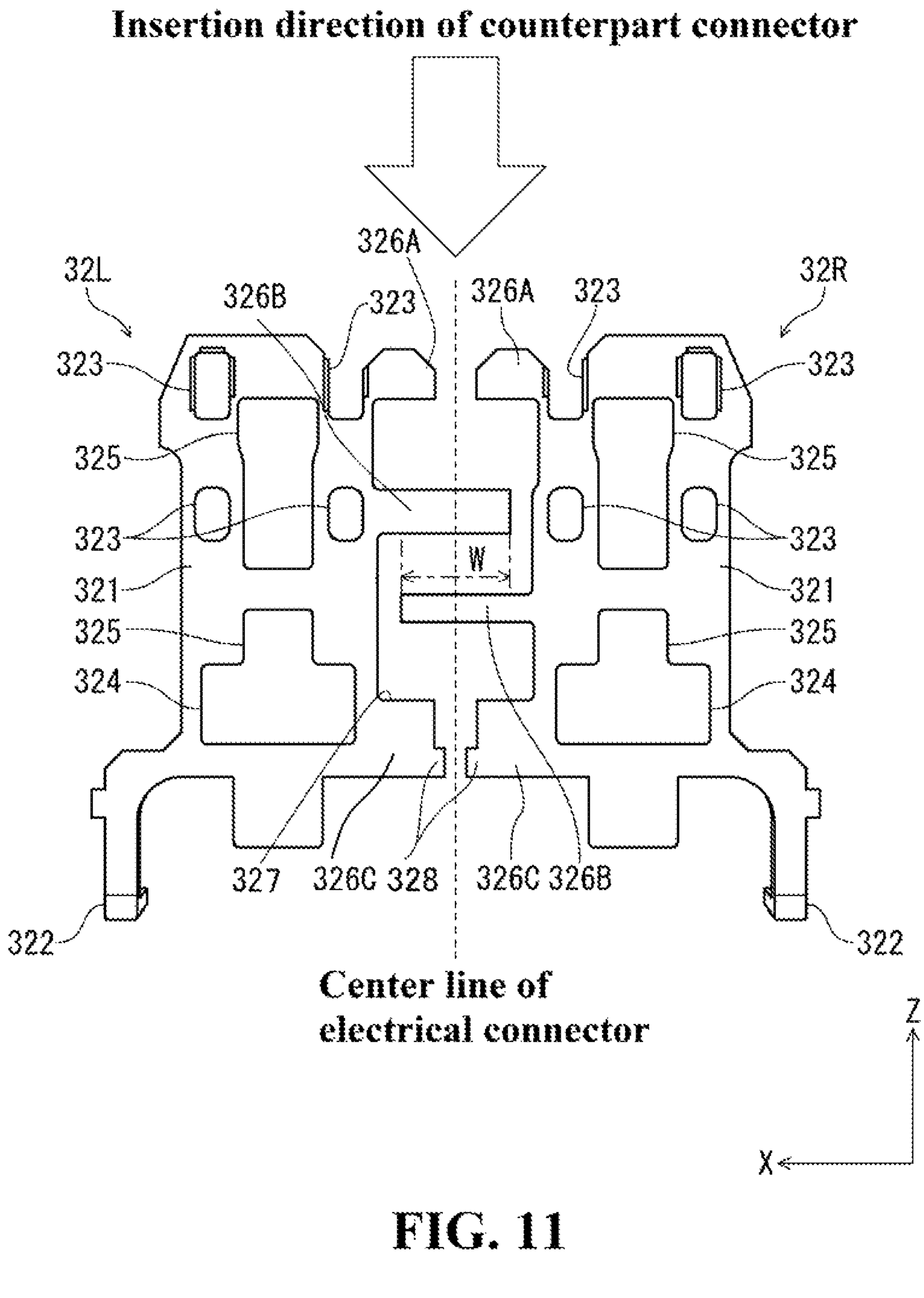
FIG. 11 is a planar view showing a first ground plate and a second ground plate contained in the inner structure shown in FIG. 8.
Figure 12:
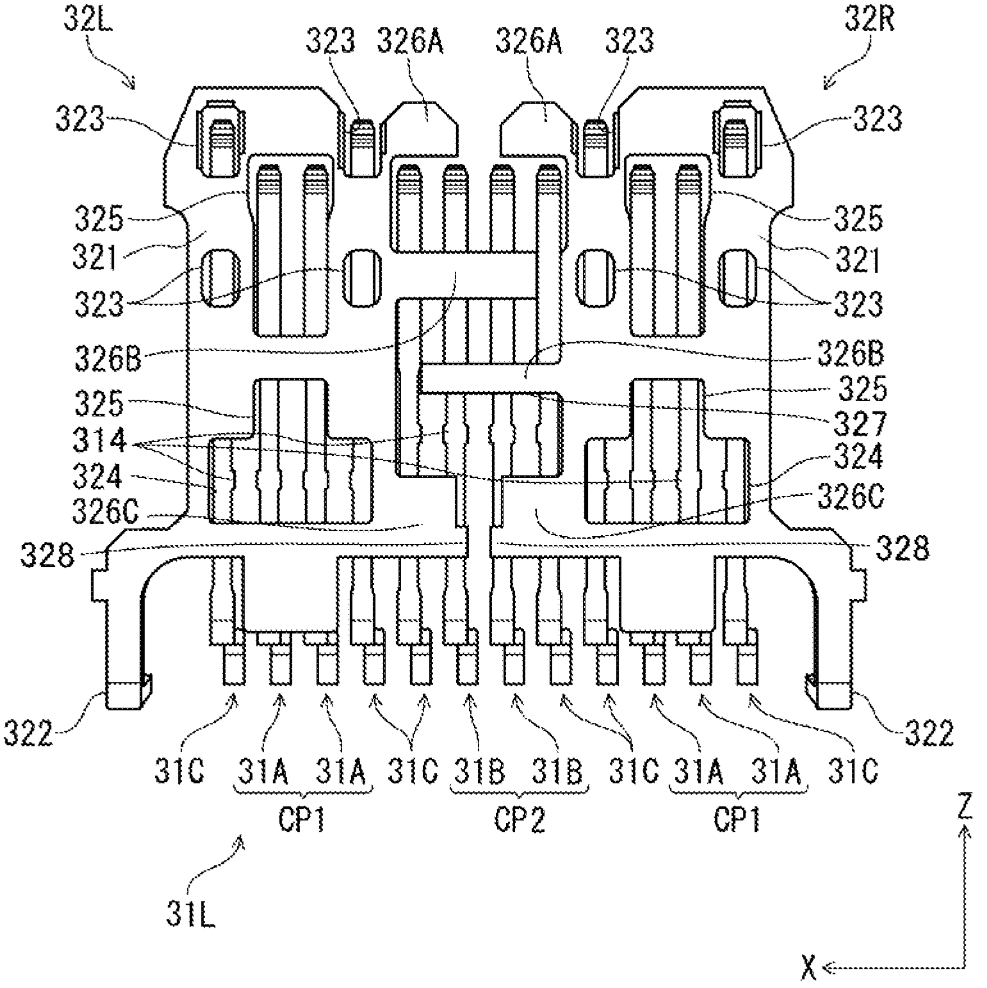
FIG. 12 is a planar view showing a positional relationship among the first ground plate, the second ground plate and the plurality of contacts shown in FIG. 11.
Figure 13:
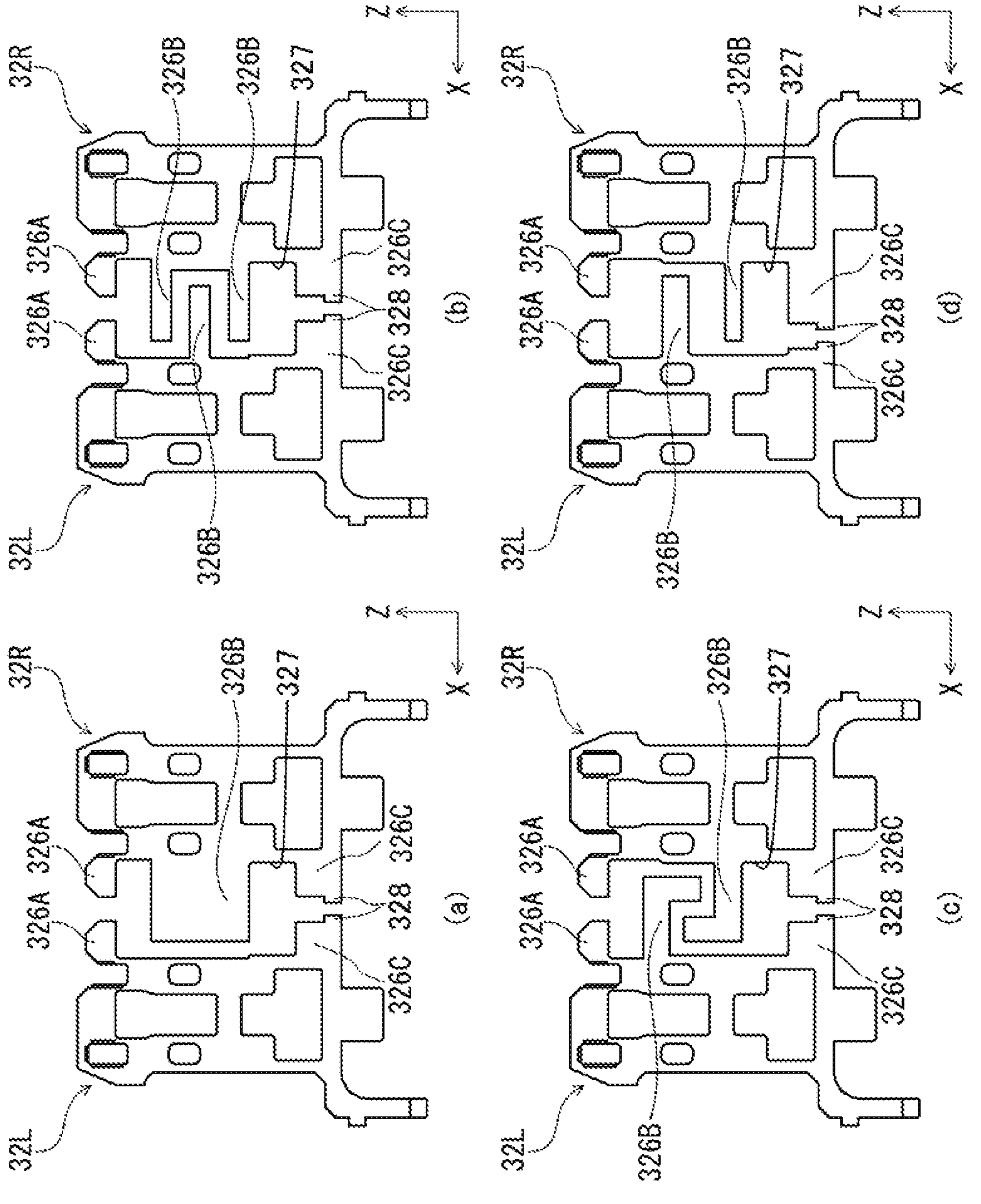
FIG. 13 is planar views showing modified examples of the first ground plate and the second ground plate contained in the inner structure shown in FIG. 8.
Figure 14:
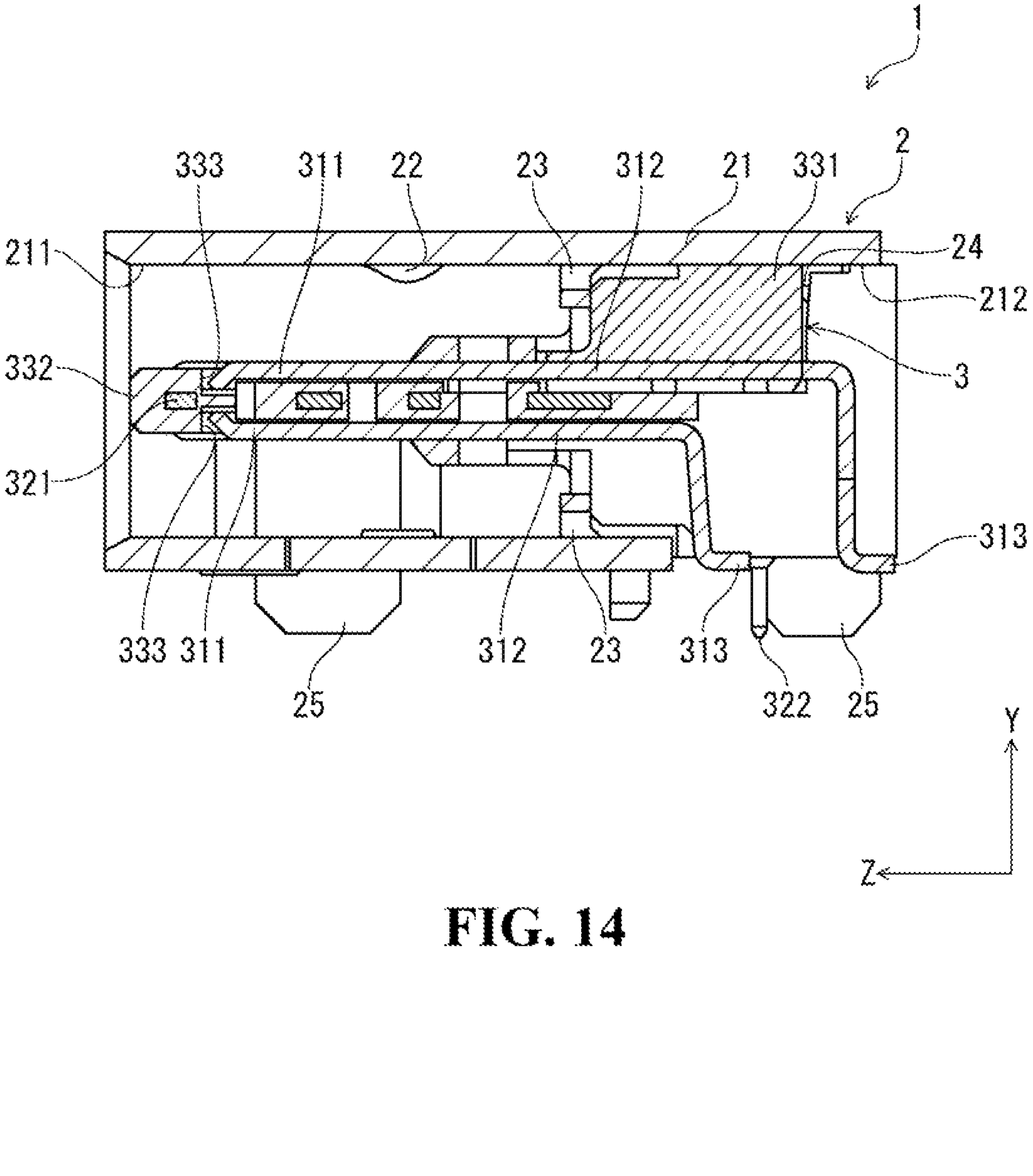
FIG. 14 is a longitudinal cross-sectional view of the electrical connector shown in FIG. 4.
Figure 15:
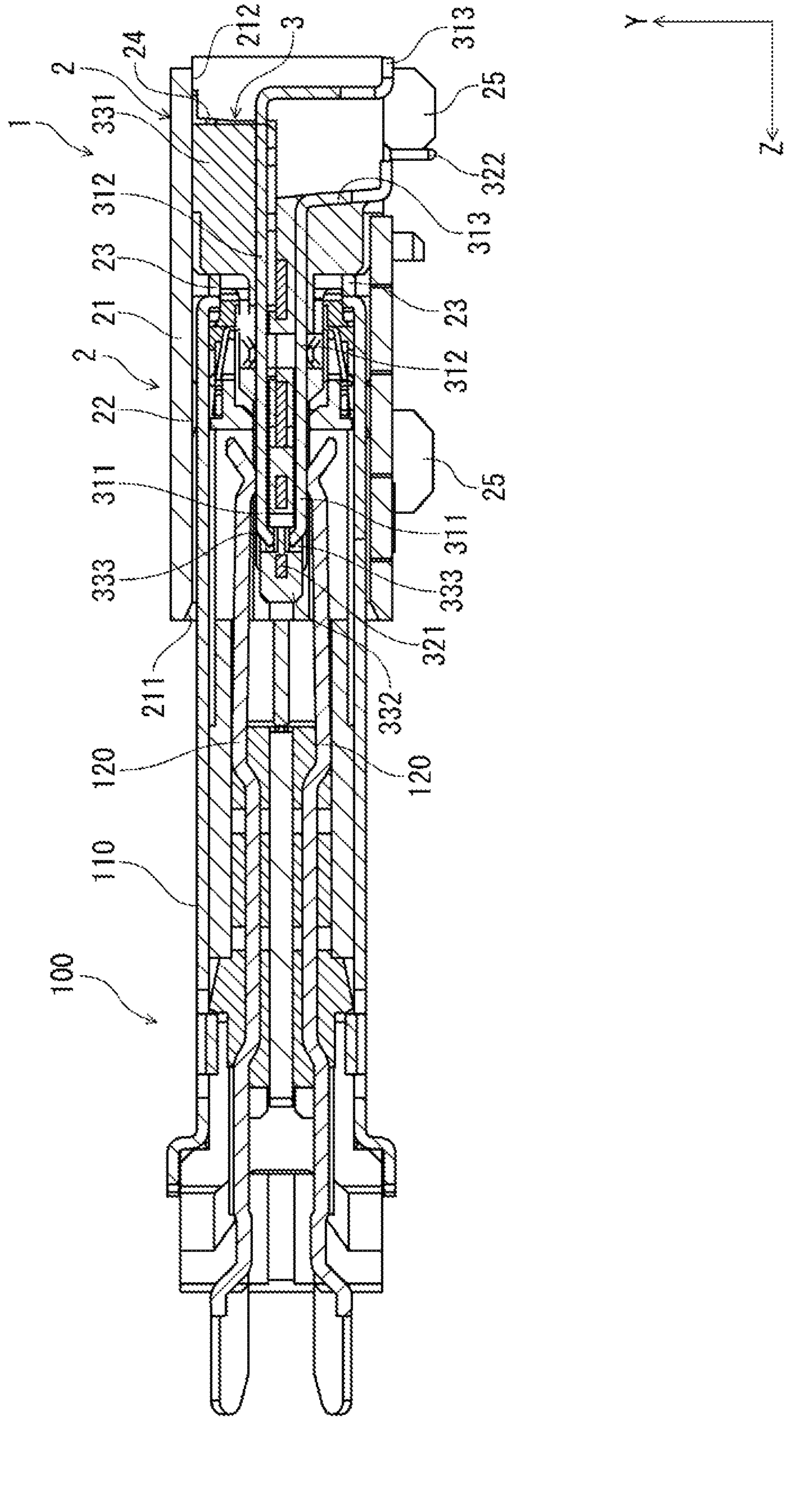
FIG. 15 is a longitudinal cross-sectional view showing a state that the electrical connector shown in FIG. 4 fits with a counterpart connector.

First, description will be given to an electrical connector according to an embodiment of the present invention with reference to FIGS. 4 to 15. FIG. 4 is a perspective view showing the electrical connector according to the embodiment of the present invention. FIG. 5 is another perspective view showing the electrical connector shown in FIG. 4 viewed from another angle. FIG. 6 is an exploded perspective view of the electrical connector shown in FIG. 4. FIG. 7 is another exploded perspective view of the electrical connector shown in FIG. 4 viewed from another angle. FIG. 8 is a perspective view showing an inner structure of the electrical connector shown in FIG. 4. FIG. 9 is a perspective view showing a first group of a plurality of contacts contained in the inner structure shown in FIG. 8. FIG. 10 is a perspective view showing a second group of the plurality of contacts contained in the inner structure shown in FIG. 8. FIG. 11 is a planar view showing a first ground plate and a second ground plate contained in the inner structure shown in FIG. 8. FIG. 12 is a planar view showing a positional relationship among the first ground plate, the second ground plate and the plurality of contacts shown in FIG. 11. FIG. 13 is a planar view showing modified examples of the first ground plate and the second ground plate contained in the inner structure shown in FIG. 8. FIG. 14 is a longitudinal cross-sectional view of the electrical connector shown in FIG. 4. FIG. 15 is a longitudinal cross-sectional view showing a state that the electrical connector shown in FIG. 4 fits with a counterpart connector.

An electrical connector 1 according to the embodiment of the present invention shown in FIGS. 4 to 15 is to be mounted on a circuit board provided in a housing of an electronic device (not shown in the drawings) as a receptacle connector. As shown in FIG. 15, when a counterpart connector 100 is inserted into the electrical connector 1 from the tip side, an electrical connection between the counterpart connector 100 and the electrical connector 1 is provided.

As shown in FIGS. 4 to 7, the electrical connector 1 contains a metallic cylindrical shell 2 and an inner structure 3 contained in the shell 2. The inner structure 3 includes a plurality of contacts 31 arranged in at least one plane, a first ground plate 32L and a second ground plate 32R facing the plurality of contacts 31 and arranged so as to be separated from each other in a ground plane parallel to the at least one plane in which the plurality of contacts 31 are arranged and an insulator 33 for holding the plurality of contacts 31, the first ground plate 32L and the second ground plate 32R in a state that the plurality of contacts 31, the first ground plate 32L and the second ground plate 32R are insulated from each other.

The shell 2 is a cylindrical member formed of a metallic material and used for covering the inner structure 3 from the outer side and fixing the electrical connector 1 on the circuit board of the electronic device. The shell 2 contains the inner structure 3 therein in a state that the inner structure 3 is covered by the shell 2 except a tip side portion and a base side portion of the insertion direction of the electrical connector 1 (the Z axis direction in each drawing). As shown in FIGS. 6 and 7, the shell 2 includes a cylindrical main body portion 21, shell contact portions 22 which contact with a shell 110 of the counterpart connector 100 when the counterpart connector 100 is inserted into the electrical connector 1 from the tip side, shell stoppers 23 which contact with a tip end of the shell 110 of the counterpart connector 100 when the counterpart connector 100 is inserted into the electrical connector 1 from the tip side, holding portions 24 for holding the insulator 33 of the inner structure 3 from the upper side and two pairs of shell leg portions 25 extending from a lateral surface of the main body portion 21 toward the lower side.

The main body portion 21 of the shell 2 has a flattened cylindrical shape as shown in FIGS. 6 and 7. The inner structure 3 is contained in a space defined by an inner surface of the cylindrical shape of the main body portion 21. An insertion port 211 for receiving the counterpart connector is formed on the tip side of the main body portion 21. On the other hand, a base side opening 212 is formed on the base side of the main body portion 21 for guiding the plurality of contacts 31, the first ground plate 32L and the second ground plate 32R of the inner structure 3 contained in the shell 2 to the circuit board of the electronic device.

In a state that the electrical connector 1 has been assembled, the inner structure 3 is contained in the main body portion 21. The plurality of contacts 31, the first ground plate 32L and the second ground plate 32R of the inner structure 3 extend from the base side opening 212 of the main body portion 21 toward the circuit board of the electronic device. When the plurality of contacts 31, the first ground plate 32L and the second ground plate 32R of the inner structure 3 are connected to the circuit board of the electronic device through board connection portions 313, 322 (see FIGS. 9 to 11), the electrical connector 1 is mounted on the circuit board of the electronic device.

The shell contact portions 22 of the shell 2 are used for making a ground potential of the electrical connector 1 equal to a ground potential of the counterpart connector 100 when the shell contact portions 22 contact with the shell 110 of the counterpart connector 100. The shell contact portions 22 of the shell 2 are a pair of protruding pieces cantilevered by an upper surface of the main body portion 21 and extending from the upper surface of the main body portion 21 of the shell 2 toward the lower direction. Each of the shell contact portions 22 is formed by cutting the upper surface of the main body portion 21 and bending a cut portion toward the lower direction (the inner direction of the main body portion 21). When the counterpart connector 100 is inserted into the main body portion 21 of the shell 2 through the insertion port 211, the shell contact portions 22 contact with the shell 110 of the counterpart connector 100 and the shell contact portions 22 are pushed from their initial positions toward the upper side. When the counterpart connector 100 is pulled from the main body portion 21 of the shell 2 through the insertion port 211, the shell contact portions 22 are elastically restored to return to the initial positions.

When the counterpart connector 100 is inserted into the insertion port 211 of the shell 2 from the tip side in the state that the electrical connector 1 has been assembled, a plurality of contacts 120 of the counterpart connector 100 respectively contact with the plurality of contacts 31 of the inner structure 3 contained in the main body portion 21 and thereby the electrical connection between the electrical connector 1 and the counterpart connector 100 inserted from the tip side is provided. Further, ground terminals of the counterpart connector 100 contact with the first ground plate 32L and the second ground plate 32R and the shell contact portions 22 contact with the shell 110 of the counterpart connector 100. As a result, the ground potential of the electrical connector 1 becomes equal to the ground potential of the counterpart connector 100.

The shell stoppers 23 of the shell 2 have a function of restricting an insertion movement of the counterpart connector 100. Two of the shell stoppers 23 of the shell 2 are formed on the upper surface of the main body portion 21 and other two of the shell stoppers 23 are formed on a lower surface of the main body portion 21. Each of the shell stoppers 23 is a U-shaped member protruding from the upper surface or the lower surface of the main body portion 21 toward the inner side of the main body portion 21. Each of the shell stoppers 23 is formed by cutting the upper surface or the lower surface of the main body portion 21 and bending a cut portion toward the inner side of the main body portion 21.

A base end surface of the U-shape of each of the shell stoppers 23 contacts with a tip end surface of a base portion 331 of the insulator 33 of the inner structure 3. With this configuration, the shell stoppers 23 hold the base portion 331 of the insulator 33 of the inner structure 3 from the tip side. When the counterpart connector 100 is inserted into the main body portion 21 of the shell 2 through the insertion port 211, the shell 110 of the counterpart connector 100 contacts with the shell stoppers 23 and thereby the insertion movement of the counterpart connector 100 is restricted.

The holding portions 24 of the shell 2 are used for holding the base portion 331 of the insulator 33 of the inner structure 3 from the upper side to prevent the inner structure 3 from removing from the shell 2 in the state that the electrical connector 1 has been assembled. The two holding portions 24 are formed on the upper surface of the main body portion 21. Each of the holding portions 24 is a plate-like member extending from the upper surface of the main body portion 21 toward the lower side (the inner side of the main body portion 21). In the state that the electrical connector 1 has been assembled, the holding portions 24 hold the base portion 331 of the insulator 33 of the inner structure 3 contained in the shell 2 from the base side. In a state before the electrical connector 1 is assembled, the holding portions 24 do not extend from the upper surface of the main body portion 21 toward the lower side (the inner side of the main body portion 21). The holding portions 24 of the shell 2 are bent toward the lower side when the electrical connector 1 is being assembled after the inner structure 3 has been positioned at a predetermined location in the main body portion 21 of the shell 2 so that the holding portions 24 hold the base portion 331 of the insulator 33 of the inner structure 3 from the upper side.

The shell leg portions 25 of the shell 2 are used for fixing the electrical connector 1 on the circuit board of the electronic device. One pair of the two pairs of the shell leg portions 25 is formed so as to protrude from base side portions of both lateral surfaces of the main body portion 21 of the shell 2 toward the lower side. The other one pair of the two pairs of the shell leg portions 25 are formed so as to protrude from substantially center portions of the both lateral surfaces of the main body portion 21 of the shell 2 toward the lower side. When the two pairs of the shell leg portions 25 of the shell 2 are inserted into engagement holes formed on the circuit board of the electronic device in the state that the electrical connector 1 has been assembled, the electrical connector 1 is fixed on the circuit board of the electronic device.

As shown in FIG. 8, the inner structure 3 includes the plurality of contacts 31 which respectively contact with the plurality of contacts 120 of the counterpart connector 100 for providing the electrical connection between the counterpart connector 100 and the electrical connector 1, the first ground plate 32L and the second ground plate 32R facing the plurality of contacts 31 and arranged so as to be separated from each other in the ground plane parallel to the at least one plane in which the plurality of contacts 31 are arranged and the insulator 33 for holding the plurality of contacts 31, the first ground plate 32L and the second ground plate 32R in a state that the plurality of contacts 31, the first ground plate 32L and the second ground plate 32R are insulated from each other.

The insulator 33 is formed of an insulation resin material and has a function of holding the plurality of contacts 31, the first ground plate 32L and the second ground plate 32R in the state that the plurality of contacts 31, the first ground plate 32L and the second ground plate 32R are insulated from each other. The insulator 33 can be obtained by an insert molding of injecting the insulation resin material into a metal mold having a shape corresponding to the shape of the insulator 33 in a state that the plurality of contacts 31, the first ground plate 32L and the second ground plate 32R are arranged in the metal mold. The insulator 33 holds the plurality of contacts 31, the first ground plate 32L and the second ground plate 32R so that the plurality of contacts 31 can respectively contact with the plurality of contacts 120 of the counterpart connector 100 and the first ground plate 32L and the second ground plate 32R can contact with the ground terminals of the counterpart connector 100 when the counterpart connector 100 is inserted into the insertion port 211 of the shell 2 from the tip side in the state that the electrical connector 1 has been assembled.

The insulator 33 includes the base portion 331 to be press-fitted into the base side opening 212 of the main body portion 21 of the shell 2 in order to fix the inner structure 3 with respect to the main body portion 21 of the shell 2 and a tongue portion 332 extending from the base portion 331 toward the tip side.

The base portion 331 is a member having an X-Y plane shape corresponding to the base side opening 212 of the main body portion 21 of the shell 2. By press-fitting the base portion 331 into the base side opening 212 of the main body portion 21 of the shell 2, the inner structure 3 is fixedly contained in the main body portion 21 of the shell 2. Fixed portions 312 (see FIGS. 9 and 10) of the plurality of contacts 31 are embedded in the base portion 331. In this state, the plurality of contacts 31, the first ground plate 32L and the second ground plate 32R are held by the insulator 33 in the state that the plurality of contacts 31, the first ground plate 32L and the second ground plate 32R are insulated from each other.

As shown in FIG. 8, a contact portion 311 of each of the plurality of contacts 31 protrudes from the tip side of the base portion 331 toward the tip side. On the other hand, as shown in FIG. 7, a board connection portion 313 (see FIGS. 9 and 10) of each of the plurality of contacts 31 and board connection portions 322 (see FIG. 12) of the first ground plate 32L and the second ground plate 32R protrude from the base portion 331 toward the base side.

The tongue portion 332 of the insulator 33 is a plate-like member extending from the base portion 331 toward the tip side. The tongue portion 332 is used for placing the plurality of contacts 31 thereon and holding the first ground plate 32L and the second ground plate 32R therein. A plurality of contact receiving portions 333 are formed on an upper surface and a lower surface of the tongue portion 332 for respectively receiving the plurality of contacts 31 shown in FIGS. 9 and 10 thereon. Further, openings 334 are formed on a tip end surface and a lateral surface of the tongue portion 332 for exposing the first ground plate 32L and the second ground plate 32R to the outside.

The plurality of contacts 31 are respectively contained in the plurality of contact receiving portions 333 formed on the upper surface of the tongue portion 332 and thereby a first group 31U shown in FIG. 9 is constituted by the plurality of contacts 31. Further, the plurality of contacts 31 are respectively contained in the plurality of contact receiving portions 333 formed on the lower surface of the tongue portion 332 and thereby a second group 31L shown in FIG. 10 is constituted of the plurality of contacts 31. Furthermore, the first ground plate 32L and the second ground plate 32R are embedded in the tongue portion 332. Portions of the first ground plate 32L and the second ground plate 32R are exposed to the outside through the openings 334.

As shown in FIG. 9, the first group 31U is constituted of the contacts 31 which are arranged in the one plane (an upper contact arrangement plane) along the X axis direction so as to be parallel to each other and respectively placed in the plurality of contact receiving portions 333 formed on the upper surface of the tongue portion 332. Similarly, as shown in FIG. 10, the second group 31L is constituted of the plurality of contacts 31 which are arranged in the other one plane (a lower contact arrangement plane) along the X axis direction so as to be parallel to each other and respectively placed in the plurality of contact receiving portions 333 formed on the lower surface of the tongue portion 332.

Each of the plurality of contacts 31 has a rod-like shape linearly extending along the Z axis direction. Each of the plurality of contacts 31 has the contact portion 311 positioned on the tip side and to be contacted with the contact 120 of the counterpart connector 100, the fixed portion 312 to be embedded in the base portion 331 of the insulator 33, the board connection portion 313 extending from the base portion 331 of the insulator 33 toward the outside and to be connected to the circuit board of the electronic device and a tie bar cut mark 314 formed by punching connection portions connecting the contacts 31 with each other at the time of performing the insert molding for the insulator 33 with a tie bar cut.

The contact portion 311 of the contact 31 contacts with the corresponding contact 120 of the counterpart connector 100 when the counterpart connector 100 is inserted into the main body portion 21 of the shell 2 through the insertion port 211 from the tip side in the state that the electrical connector 1 has been assembled. At this time, the counterpart connector 100 and the electrical connector 1 take a fitting state and thereby the electrical connection between the counterpart connector 100 and the electrical connector 1 is provided.

The fixed portion 312 of the contact 31 extends in the same direction as the extending direction of the contact portion 311. The fixed portion 312 is embedded in the base portion 331 of the insulator 33 and thereby the contact 31 is fixedly held by the insulator 33.

The board connection portion 313 of the contact 31 extends from a base end of the fixed portion 312 in the same direction as the extending direction of the fixed portion 312 and extends from the base portion 331 of the insulator 33 toward the outside. The board connection portion 313 is connected to the circuit board of the electronic device.

The tie bar cut mark 314 of the contact 31 is formed by the tie bar cut which is performed after the insert molding for the insulator 33. At the time of performing the insert molding for the insulator 33, the plurality of contacts 31 are connected with each other by the connection portions in order to prevent a positional shift and an inclination of each of the plurality of contacts 31 in the insulator 33. Thus, the tie bar cut is performed after the insert molding for the insulator 33 for punching the connection portions connecting the plurality of contacts 31 with each other to separate the plurality of contacts 31 from each other. The tie bar cut mark 314 of the contact 31 is a remaining portion of the connection portion punched by the tie bar cut.

Further, the contacts 31 constituting the first group 31U contain two high frequency signal contact pairs CP1 each constituted of two high frequency signal contacts 31A for transmitting and receiving a high frequency signal with the counterpart connector 100, a normal signal contact pair CP2 constituted of two normal signal contacts 31B for transmitting and receiving a normal frequency signal with the counterpart connector 100 and a plurality of non-signal contacts 31C used for purposes other than the signal transmission and reception.

Each of the two high frequency signal contact pairs CP1 is constituted of the two adjacent high frequency signal contacts 31A. The two high frequency signal contact pairs CP1 are respectively located at both side portions of the electrical connector 1 in the width direction of the electrical connector 1 (the X axis direction in the drawings). Further, the non-signal contacts 31C are respectively arranged on both sides of each of the two high frequency signal contact pairs CP1. The non-signal contacts 31C arranged on the outer side of each of the two high frequency signal contact pairs CP1 in FIG. 9 are ground terminals to be respectively contacted with the ground terminals of the counterpart connector 100. On the other hand, the non-signal contacts 31C arranged on the inner side of each of the two high frequency signal contact pairs CP1 in FIG. 9 are power supply terminals for supplying power to the electrical connector 1. At least the high frequency signal contact pair CP1 arranged on the rear side in FIG. 9 and the non-signal contacts 31C arranged on the both sides of this high frequency signal contact pair CP1 are located above the first ground plate 32L. On the other hand, at least the high frequency signal contact pair CP1 arranged on the front side in FIG. 9 and the non-signal contacts 31C arranged on the both sides of this high frequency signal contact pair CP1 are located above the second ground plate 32R.

The normal signal contact pair CP2 is constituted of the two normal signal contacts 31B for transmitting and receiving the normal frequency signal with the counterpart connector 100 and arranged between the two high frequency signal contact pairs CP1. Further, the non-signal contacts 31C are arranged on both sides of the normal signal contact pair CP2. Each of the non-signal contacts 31C arranged on the both side of the normal signal contact pair CP2 is an identification contact used for transmitting and receiving an identification signal for identifying the electrical connector 1.

As shown in FIG. 10, each of the contacts 31 constituting the second group 31L has the same configuration as each of the contacts 31 constituting the first group 31U described above. The first group 31U and the second group 31L each constituted of the contacts 31 are arranged so as to face each other through the first ground plate 32L and the second ground plate 32R. Further, the first group 31U and the second group 31L are arranged so as to be vertically symmetric through the first ground plate 32L and the second ground plate 32R. Namely, the high frequency signal contacts 31A of the second group 31L respectively face the high frequency signal contacts 31A of the first group 31U, the normal signal contacts 31B of the second group 31L respectively face the normal signal contacts 31B of the first group 31U and the non-signal contacts 31C of the second group 31L respectively face the non-signal contacts 31C of the first group 31U.

The number and the arrangement of each of the high frequency signal contacts 31A, the normal signal contacts 31B and the non-signal contacts 31C are not particularity limited and they are appropriately set according to a standard with which the electrical connector 1 should comply.

Each of the first ground plate 32L and the second ground plate 32R is a plate-like member formed of a metallic material and embedded in the tongue portion 332 of the insulator 33. Each of the first ground plate 32L and the second ground plate 32R includes a plate-like main body portion 321 and the board connection portion 322 extending from a base end of the main body portion 321 toward the lower side and exposed to the outside of the insulator 33.

The first ground plate 32L and the second ground plate 32R are arranged in the ground plane so that the main body portions 321 of the first ground plate 32L and the second ground plate 32R are bilaterally symmetric through a center line of the electrical connector 1 in the width direction of the electrical connector 1 (the X axis direction) perpendicular to the insertion direction of the counterpart connector 100 (the Z axis direction). Specifically, as shown in FIG. 11, the first ground plate 32L is arranged in the ground plane so as to be in an area positioned on the positive direction side of the X axis than the center line of the electrical connector 1 in the X axis direction of the electrical connector 1. The second ground plate 32R is arranged in the ground plane so as to be in an area positioned on the negative direction side of the X axis than the center line of the electrical connector 1 in the X axis direction of the electrical connector 1.

As shown in FIG. 11, the first ground plate 32L and the second ground plate 32R are arranged in the ground plane so as to be separated from each other. Further, a space between the first ground plate 32L and the second ground plate 32R is filled with the insulator 33 formed of the insulation resin material. Thus, the first ground plate 32L and the second ground plate 32R are held by the insulator 33 in a state that the first ground plate 32L and the second ground plate 32R are insulated from each other.

Further, in the state that the first ground plate 32L and the second ground plate 32R are held by the insulator 33, the portions of the first ground plate 32L and the second ground plate 32R are exposed to the outside through the openings 334 of the tongue portion 332 of the insulator 33.

FIG. 12 shows a positional relationship among the first ground plate 32L, the second ground plate 32R and the plurality of contacts 31. In this regard, although the first group 31U constituted of the contacts 31 is omitted in FIG. 12 in order to specifically show the positional relationship among the first ground plate 32L, the second ground plate 32R and the plurality of contacts 31, the first group 31U is arranged so as to be vertically symmetric to the second group 31L through the first ground plate 32L and the second ground plate 32R.

As is clear from FIG. 12, one of the two high frequency signal contact pairs CP1 of the first group 31U and the non-signal contacts 31C respectively arranged on the both sides of the one of the two high frequency signal contact pairs CP1 among the plurality of contacts 31 are located above the first ground plate 32L. On the other hand, the other one of the two high frequency signal contact pairs CP1 of the first group 31U and the non-signal contacts 31C respectively arranged on the both sides of the other one of the two high frequency signal contact pairs CP1 among the plurality of contacts 31 are located above the second ground plate 32R. Similarly, one of the two high frequency signal contact pairs CP1 of the second group 31L and the non-signal contacts 31C respectively arranged on the both sides of the one of the two high frequency signal contact pairs CP1 among the plurality of contacts 31 are located below the first ground plate 32L. On the other hand, the other one of the two high frequency signal contact pairs CP1 of the second group 31L and the non-signal contacts 31C respectively arranged on the both sides of the other one of the two high frequency signal contact pairs CP1 among the plurality of contacts 31 are located below the second ground plate 32R.

As described above, in the electrical connector 1 of the present invention, the first ground plate 32L facing the one of the two high frequency signal contact pairs CP1 of each of the first group 31U and the second group 31L is separated from the second ground plate 32R facing the other one of the two high frequency signal contact pairs CP1 of each of the first group 31U and the second group 31L. Thus, when the high frequency signal flows in the one of the two high frequency signal contact pairs CP1, the other one of the high frequency signal contact pairs CP1 does not receive any effect from the high frequency signal flowing in the one of the two high frequency signal contact pairs CP1 through the first ground plate 32L and the second ground plate 32R. Therefore, it is possible to suppress occurrence of a crosstalk between the high frequency signal contact pairs CP1 of each of the first group 31U and the second group 31L.

In this regard, a distance between the first ground plate 32L and the second ground plate 32R at a location where the first ground plate 32L and the second ground plate 32R approach most to each other in the state that the first ground plate 32L and the second ground plate 32R are held by the insulator 33 so as to be separated from each other in the ground plane is equal to or more than a distance between each of the first ground plate 32L and the second ground plate 32R and each of the plurality of contacts 31 at a location where each of the first ground plate 32L and the second ground plate 32R approach most to each of the plurality of contacts 31. If the distance between the first ground plate 32L and the second ground plate 32R at the location where the first ground plate 32L and the second ground plate 32R approach most to each other is less than the distance between each of the first ground plate 32L and the second ground plate 32R and each of the plurality of contacts 31 at the location where each of the first ground plate 32L and the second ground plate 32R approach most to each of the plurality of contacts 31, there is a case where a pseudo electrical circuit is formed between the first ground plate 32L and the second ground plate 32R and thus the above-mentioned effect of suppressing the crosstalk cannot be provided.

Next, specific configurations of the first ground plate 32L and the second ground plate 32R will be described in detail. The main body portion 321 of each of the first ground plate 32L and the second ground plate 32R is embedded in the tongue portion 332 of the insulator 33 so as to be parallel to the planes (the upper contact arrangement plane and the lower contact arrangement plane) in which the plurality of contacts 31 are arranged. Further, the main body portion 321 of each of the first ground plate 32L and the second ground plate 32R includes a plurality of positioning holes 323 through which positioning pins are respectively passed for positioning each of the plurality of contacts 31 at the time of performing the insert-molding for the insulator 33 so that the insulator 33 holds the plurality of contacts 31, the first ground plate 32L and the second ground plate 32R, a plurality of tie bar cut holes 324 for enabling the tie bar cut for punching the connection portions of the plurality of contacts 31 which are connected with each other by the connection portions at the time of performing the insert molding for the insulator 33 to separate the plurality of contacts 31 from each other and a plurality of impedance adjustment holes 325 for adjusting impedances of the high frequency signal contacts 31A among the plurality of contacts 31.

The positioning holes 323 are formed in the main body portions 321 for passing the positioning pins therethrough for positioning each of the plurality of contacts 31 at the time of performing the insert molding for the insulator 33 so that the insulator 33 holds the plurality of contacts 31, the first ground plate 32L and the second ground plate 32R to obtain the inner structure 3. In this regard, when the insulator 33 is insert-molded, the positioning pins for positioning each of the plurality of contacts 31 are respectively passed through the tie bar cut holes 324, the impedance adjustment holes 325 and the space between the first ground plate 32L and the second ground plate 32R in addition to the positioning holes 323. For example, in order to position the non-signal contacts 31C located on the most outer side of each of the first group 31U and the second group 31L constituted of the contacts 31, the positioning pins are respectively passed through the two positioning holes 323 and the tie bar cut hole 324. Similarly, in order to position the high frequency signal contacts 31A, the positioning pins are respectively passed through the tie bar cut holes 324 and the impedance adjustment holes 325. Further, in order to position the normal signal contacts 31B, the positioning pins are passed through the space between the first ground plate 32L and the second ground plate 32R. The number of the positioning holes 323 and the position and the shape of each of the positioning holes 323 formed in the main body portion 321 are not particularly limited and they are appropriately set depending on needs at the time of performing the insert molding for the insulator 33.

The tie bar cut holes 324 are formed in the main body portions 321 for enabling the tie bar cut for punching the connection portions of the plurality of contacts 31 which are connected with each other by the connection portions at the time of performing the insert molding for the insulator 33 to separate the plurality of contacts 31 from each other. The positioning for the plurality of contacts 31 due to the positioning pins is performed during the insert molding for the insulator 33 as described above. In order to more accurately position the plurality of contacts 31 in the insert molding, it is preferred to hold the plurality of contacts 31 in a state that the plurality of contacts 31 are connected with each other at their base side portion. Thus, the plurality of contacts 31 are connected with each other by the connection portions provided at their base side portions at the time of performing the insert molding for the insulator 33. In the aspect shown in the drawings, among the contacts 31 constituting the first group 31U and the second group 31L, the two high frequency signal contacts 31A constituting the high frequency signal contact pair CP1 and the two non-signal contacts 31C respectively positioned on the both sides of the high frequency signal contact pair CP1 are connected with each other by the connection portions, and thereby a first contact assembly and a second contact assembly are constituted. In FIGS. 9 and 10, the first contact assembly is constituted of the two high frequency signal contacts 31A constituting the high frequency signal contact pair CP1 positioned on the positive direction side of the X axis and the two non-signal contacts 31C respectively positioned on the both sides of this high frequency signal contact pair CP1. On the other hand, the second contact assembly is constituted of the two high frequency signal contacts 31A constituting the high frequency signal contact pair CP1 positioned on the negative direction side of the X axis and the two non-signal contacts 31C respectively positioned on the both sides of this high frequency signal contact pair CP1. Further, the two normal signal contacts 31B constituting the normal signal contact pair CP2 and the two non-signal contacts 31C positioned on the both sides of the normal signal contact pair CP2 are connected by the connection portions and thereby a third contact assembly is constituted. Namely, the plurality of contacts 31 at the time of performing the insert molding for the insulator 33 are constituted of the three contact assemblies, that is the first contact assembly, the second contact assembly and the third contact assembly each formed by connecting four contacts 31 with each other.

The tie bar cut is performed for punching the connection portions of the four connected contacts 31 of each of the first contact assembly, the second contact assembly and the third contact assembly after the insert molding for the insulator 33 to separate the plurality of contacts 31 from each other. Specifically, the tie bar cut for the four contacts 31 constituting the first contact assembly is performed through the tie bar cut hole 324 formed in the first ground plate 32L. Similarly, the tie bar cut for the four contacts 31 constituting the second contact assembly is performed through the tie bar cut hole 324 formed in the second ground plate 32R. On the other hand, the tie bar cut for the four contacts 31 constituting the third contact assembly is performed through a space 327 (see FIGS. 11 and 12) formed between the first ground plate 32L and the second ground plate 32R. Due to the tie bar cut for the four contacts 31 constituting each of the first contact assembly, the second contact assembly and the third contact assembly, the plurality of contacts 31 are separated from each other and the tie bar cut marks 314 are formed on the plurality of contacts 31.

The impedance adjustment holes 325 are formed at positions on the main body portions 321 respectively corresponding to the high frequency signal contacts 31A in order to adjust the impedance of each of the high frequency signal contacts 31A. The number of the impedance adjustment holes 325 and the position and the shape of each of the impedance adjustment holes 325 are not particularly limited and they are appropriately set depending on a required impedance characteristic of each of the high frequency signal contact 31A.

As shown in FIG. 12, at least one of the positioning hole 323, the tie bar cut hole 324 and the impedance adjustment hole 325 is formed at a position on the main body portion 321 of each of the first ground plate 32L and the second ground plate 32R corresponding to each of the plurality of contacts 31.

Further, in the electrical connector 1 of the present invention, at least one of the first ground plate 32L and the second ground plate 32R includes one or more extending portion extending from one of the first ground plate 32L and the second ground plate 32R toward the other one of the first ground plate 32L and the second ground plate 32R in the ground plane. Due to the one or more extending portion of the at least one of the first ground plate 32L and the second ground plate 32R, which extends from the one to the other one in the ground plane, it is possible to narrow an area in which the first ground plate 32L or the second ground plate 32R does not exist when the electrical connector 1 is viewed from the insertion direction of the counterpart connector 100 (the Z axis direction) or prevent formation of such an area.

In the aspect shown in FIGS. 11 and 12, both of the first ground plate 32L and the second ground plate 32R have the one or more extending portions extending from one of the first ground plate 32L and the second ground plate 32R toward the other one of the first ground plate 32L and the second ground plate 32R in the ground plane. Specifically, the first ground plate 32L has a tip side extending portion (a second extending portion) 326A extending from a tip side portion of the main body portion 321 toward the second ground plate 32R, a center extending portion (a first extending portion) 326B extending from a center portion of the main body portion 321 in the insertion direction of the counterpart connector 100 (the Z axis direction) toward the second ground plate 32R and a base side extending portion (a third extending portion) 326C extending from a base side portion of the main body portion 321 toward the second ground plate 32R. Similarly, the second ground plate 32R has a tip side extending portion (a second extending portion) 326A extending from a tip side portion of the main body portion 321 toward the first ground plate 32L, a center extending portion (a first extending portion) 326B extending from a center portion of the main body portion 321 in the insertion direction of the counterpart connector 100 (the Z axis direction) toward the first ground plate 32L and a base side extending portion (a third extending portion) 326C extending from a base side portion of the main body portion 321 toward the first ground plate 32L. Further, the space 327 is defined between the first ground plate 32L and the second ground plate 32R and between the center extending portion 326B of the second ground plate 32R and the base side extending portion 326C of the first ground plate 32L for enabling the above-mentioned tie bar cut for the four contacts 31 constituting the third contact assembly.

Further, as shown in FIG. 12, the main body portion 321 of the first ground plate 32L faces the two high frequency signal contacts 31A and the two non-signal contacts 31C respectively positioned on the both sides of the high frequency signal contact pair CP1 which constitute the first contact assembly. The main body portion 321 of the second ground plate 32R faces the two high frequency signal contacts 31A and the two non-signal contacts 31C respectively positioned on the both sides of the high frequency signal contact pair CP1 which constitute the second contact assembly. Further, in the planar view, the two normal signal contacts 31B and the two non-signal contacts 31C respectively positioned on the both sides of the normal signal contact pair CP2 which constitute the third contact assembly are located in the space between the main body portion 321 of the first ground plate 32L and the main body portion 321 of the second ground plate 32R.

The center extending portion 326B of the first ground plate 32L faces the two normal signal contacts 31B constituting the normal signal contact pair CP2 and the non-signal contact 31C adjacent to the normal signal contact pair CP2 on the positive direction side of the X axis which constitute the third contact assembly. The center extending portion 326B of the second ground plate 32R faces the two normal signal contacts 31B constituting the normal signal contact pair CP2 and the non-signal contact 31C adjacent to the normal signal contact pair CP2 on the negative direction side of the X axis which constitute the third contact assembly. Further, the base side extending portion 326C of the first ground plate 32L faces two of the contacts 31 positioned on the positive direction side of the X axis among the four contacts 31 which constitute the third contact assembly. The base side extending portion 326C of the second ground plate 32R faces two of the contacts 31 positioned on the negative direction side of the X axis among the four contacts 31 which constitute the third contact assembly.

As shown in FIG. 12, the two normal signal contacts 31B constituting the normal signal contact pair CP2 face both of the center extending portion 326B of the first ground plate 32L and the center extending portion 326B of the second ground plate 32R.

Further, in the planar view, the tie bar cut marks 314 of the four contacts 31 which constitute the first contact assembly are located in the tie bar cut hole 324 of the first ground plate 32L. Similarly, the tie bar cut marks 314 of the four contacts 31 which constitute the second contact assembly are located in the tie bar cut hole 324 of the second ground plate 32R in the planar view. Further, in the planar view, the tie bar cut marks 314 of the four contacts 31 which constitute the third contact assembly are located in the space 327 between the first ground plate 32L and the second ground plate 32R.

Further, at the time of performing the insert molding for the insulator 33, the first ground plate 32L and the second ground plate 32R are connected with each other by a connection portion which is formed between the base side extending portion 326C of the first ground plate 32L and the base side extending portion 326C of the second ground plate 32R. After the insert molding for the insulator 33, this connection portion is punched and thereby the first ground plate 32L and the second ground plate 32R are held by the insulator 33 so that the first ground plate 32L and the second ground plate 32R are separated from each other. Punching marks 328 which are remaining portions of the punched connection portion are formed at tip end portions of the base side extending portions 326C of the first ground plate 32L and the second ground plate 32R.

By providing the one or more extending portion extending from one of the first ground plate 32L and the second ground plate 32R toward the other one of the first ground plate 32L and the second ground plate 32R in the ground plane at the at least one of the first ground plate 32L and the second ground plate 32R as shown in FIGS. 11 and 12, it is possible to narrow the area in which the first ground plate 32L or the second ground plate 32R does not exist when the electrical connector 1 is viewed from the insertion direction of the counterpart connector 100 (the Z axis direction) or prevent the formation of such an area. Since the first ground plate 32L and the second ground plate 32R provide a stress in the plane direction in the inner structure 3 (a stress with respect to force for curving and bending the inner structure 3 along the insertion direction of the counterpart connector 100), this configuration makes it possible to narrow an area in which the stress in the plane direction in the inner structure 3 significantly reduces or prevent formation of such an area. As a result, it is possible to suppress warpage and bending of the inner structure 3 and thereby it is possible to suppress a contact failure between the counterpart connector 100 and the electrical connector 1 when the counterpart connector 100 is inserted into the electrical connector 1 from the tip side.

Especially, in the aspect shown in FIGS. 11 and 12, at least tip end portions of the center extending portions 326B of the first ground plate 32L and the second ground plate 32R are overlapped with each other in the insertion direction of the counterpart connector 100 (the Z axis direction). Thus, when the electrical connector 1 is viewed from the insertion direction of the counterpart connector 100 (the Z axis direction), there is no area in which the first ground plate 32L or the second ground plate 32R does not exist. With this configuration, the electrical connector 1 shown in the drawings does not have the area in which the stress in the plane direction in the inner structure 3 significantly reduces. Thus, it is possible to reliably suppress the occurrence of the warpage and the bending of the inner structure 3.

In the insertion direction of the counterpart connector 100 (the Z axis direction), a width W (a length in the width direction of the electrical connector 1 (the X axis direction)) of the area in which the center extending portion 326B of the first ground plate 32L and the center extending portion 326B of the second ground plate 32R are overlapped is preferably equal to or more than 0.25 mm and more preferably equal to or more than 0.5 mm. If the width W is less than the above value, the effect of preventing the reduction of the stress in the plane direction in the inner structure 3 cannot be sufficiently exerted.

Further, in the aspect shown in FIGS. 11 and 12, the location where the first ground plate 32L and the second ground plate 32R approach most to each other is positioned between the tip side extending portion 326A of the first ground plate 32L and the tip side extending portion 326A of the second ground plate 32R, between the center extending portion 326B of the first ground plate 32L and the main body portion 321 of the second ground plate 32R, between the main body portion 321 of the first ground plate 32L and the center extending portion 326B of the second ground plate 32R or between the base side extending portion 326C of the first ground plate 32L and the base side extending portion 326C of the second ground plate 32R. As described above, the distance between the first ground plate 32L and the second ground plate 32R at the location where the first ground plate 32L and the second ground plate 32R approach most to each other is equal to or more than the distance between each of the first ground plate 32L and the second ground plate 32R and each of the plurality of contacts 31 at the location where each of the first ground plate 32L and the second ground plate 32R and each of the plurality of contacts 31 approach most to each other.

Although both of the first ground plate 32L and the second ground plate 32R include the extending portion extending from one of the first ground plate 32L and the second ground plate 32R toward the other one of the first ground plate 32L and the second ground plate 32R in the aspect shown in FIGS. 11 and 12, the present invention is not limited thereto. For example, the scope of the present invention also contains the aspect in which only one of the first ground plate 32L and the second ground plate 32R includes the extending portion extending from the one of the first ground plate 32L and the second ground plate 32R toward the other one of the first ground plate 32L and the second ground plate 32R. Specifically, the scope of the present invention contains the aspect in which only the first ground plate 32L includes at least one of the tip side extending portion 326A, the center extending portion 326B and the base side extending portion 326C. In this case, although it is impossible to completely prevent the formation of the area in which the first ground plate 32L or the second ground plate 32R does not exist when the electrical connector 1 is viewed from the insertion direction of the counterpart connector 100 (the Z axis direction), it is possible to reduce such an area. Thus, it is possible to narrow the area in which the stress in the plane direction in the inner structure 3 significantly reduces, and thereby suppressing the warpage and the bending of the inner structure 3.

The space 327 is defined by the base side extending portions 326C of the first ground plate 32L and the second ground plate 32R and the center extending portion 326B of the second ground plate 32R and between the first ground plate 32L and the second ground plate 32R for enabling the tie bar cut with respect to the above-mentioned third contact assembly. In the electrical connector 1 of the present invention, the space 327 between the first ground plate 32L and the second ground plate 32R is utilized for the tie bar cut with respect to the four contacts 31 constituting the third contact assembly. Thus, it is not necessary to form an additional tie bar cut hole 324 in the first ground plate 32L and the second ground plate 32R for enabling the tie bar cut with respect to the four contacts 31 constituting the third contact assembly. Therefore, it is possible to reduce the numbers of the tie bar cut holes 324 and the size of each of the tie bar cut holes 324 formed in the first ground plate 32L and the second ground plate 32R. As described in the section of the background art, the stress occurs in the insulator 33 due to the non-uniformity of cooling (the uninform cooling) for the insulation resin material at the time of performing the insert molding for the insulator 33 and this stress causes the warpage and the bending of the inner structure 3 at the locations where the tie bar cut holes 324 are formed. On the other hand, since the number of the tie bar cut holes 324 and the size of each of the tie bar cut holes 324 formed in the first ground plate 32L and the second ground plate 32R are small in the electrical connector 1 of the present invention, the warpage and the bending of the inner structure 3 at the time of performing the insert molding for the insulator 33 are suppressed.

Further, the warpage and the bending of the inner structure 3 at the location corresponding to the space between the first ground plate 32L and the second ground plate 32R at the time of performing the insert molding for the insulator 33 are also suppressed by the tip side extending portions 326A, the center extending portions 326B and the base side extending portions 326C of the first ground plate 32L and the second ground plate 32R.

The number of the extending portions and the position and the shape of each of the extending portions contained in at least one of the first ground plate 32L and the second ground plate 32R can be appropriately set according to a required stress in the plane direction in the inner structure 3. For example, FIG. 13 shows modified examples of the first ground plate 32L and the second ground plate 32R.

FIG. 13(*a*) shows one modified example of the first ground plate 32L and the second ground plate 32R. In the modified example shown in FIG. 13(*a*), the center extending portion 326B of the first ground plate 32L is omitted and the width of the center extending portion 326B of the second ground plate 32R in the Z axis direction increases compared with the configuration shown in FIG. 11. In this case, the center extending portion 326B of the second ground plate 32R is overlapped with the tip side extending portion 326A and the base side extending portion 326C of the first ground plate 32L in the insertion direction of the counterpart connector 100 (the Z axis direction). In the modified example shown in FIG. 13(*a*), a percentage of an area occupied by the center extending portion 326B of the second ground plate 32R increases in a linear area passing through the space between the tip side extending portions 326A of the first ground plate 32L and the second ground plate 32R and the space between the base side extending portions 326C of the first ground plate 32L and the second ground plate 32R compared with the configuration shown in FIG. 11. Thus, it is possible to more effectively prevent the reduction of the stress in the plane direction in the inner structure 3 in the linear area passing through the space between the tip side extending portions 326A of the first ground plate 32L and the second ground plate 32R and the space between the base side extending portions 326C of the first ground plate 32L and the second ground plate 32R.

In the modified example shown in FIG. 13(*b*), the second ground plate 32R includes two center extending portions 326B extending in parallel toward the first ground plate 32L and the center extending portion 326B of the first ground plate 32L and the two center extending portions 326B of the second ground plate 32R are alternately positioned in the insertion direction of the counterpart connector 100 (the Z axis direction). In the modified example shown in FIG. 13(*b*), the percentage of the area occupied by the center extending portions 326B of the second ground plate 32R also increases in the linear area passing through the space between the tip side extending portions 326A of the first ground plate 32L and the second ground plate 32R and the space between the base side extending portions 326C of the first ground plate 32L and the second ground plate 32R compared with the configuration shown in FIG. 11.

In the modified example shown in FIG. 13(*c*), a tip end portion of the center extending portion 326B of the first ground plate 32L is bent toward the negative direction of the Z axis and a tip end portion of the extending portion 326B of the second ground plate 32R is bent toward the positive direction of the Z axis. Thus, in the modified example shown in FIG. 13(*c*), the center extending portion 326B of the first ground plate 32L and the center extending portion 326B of the second ground plate 32R are overlapped not only in the insertion direction of the counterpart connector 100 (the Z axis direction) but also in the width direction of the electrical connector 1 (the X axis direction) perpendicular to the insertion direction of the counterpart connector 100. In the modified example shown in FIG. 13(C), the percentage of the area occupied by the center extending portions 326B of the second ground plate 32R also increases in the linear area passing through the space between the tip side extending portions 326A of the first ground plate 32L and the second ground plate 32R and the space between the base side extending portions 326C of the first ground plate 32L and the second ground plate 32R compared with the configuration shown in FIG. 11.

In the modified example shown in FIG. 13(*d*), the width of the base side extending portion 326C of the first ground plate 32L in the X axis direction decreases and the width of the base side extending portion 326C of the second ground plate 32R in the X axis direction increases. Thus, the space between the tip side extending portions 326A of the first ground plate 32L and the second ground plate 32R and the space between the base side extending portions 326C of the first ground plate 32L and the second ground plate 32R are not positioned in the same linear area. If the space between the tip side extending portions 326A of the first ground plate 32L and the second ground plate 32R and the space between the base side extending portions 326C of the first ground plate 32L and the second ground plate 32R are positioned in the same linear area, the stress in the plane direction in the inner structure 3 reduces in this linear area. On the other hand, in the modified example shown in FIG. 13(*d*), since the space between the tip side extending portions 326A of the first ground plate 32L and the second ground plate 32R and the space between the base side extending portion 326C of the first ground plate 32L and the second ground plate 32R are not positioned in the same linear area, it is possible to prevent the formation of the area in which the stress in the plane direction in the inner structure 3 reduces.

The modified examples shown in FIGS. 13(*a*) to 13(*c*) are obtained by modifying the configuration shown in FIG. 11 for increasing the percentage of the area occupied by the extending portions of the first ground plate 32L and the second ground plate 32R in the area between the main body portion 321 of the first ground plate 32L and the main body portion 321 of the second ground plate 32R. The modified example shown in FIG. 13(*d*) is obtained by modifying the configuration shown in FIG. 11 for more effectively preventing the reduction of the stress in the plane direction in the inner structure 3 in the linear area passing through the space between the tip side extending portions 326A of the first ground plate 32L and the second ground plate 32R and the space between the base side extending portions 326C of the first ground plate 32L and the second ground plate 32R.

Even in the case of using any one of the modified examples of the first ground plate 32L and the second ground plate 32R described with respect to FIG. 13, it is possible to prevent the formation of the area in which the first ground plate 32L or the second ground plate 32R does not exist when the electrical connector 1 is viewed from the insertion direction of the counterpart connector 100 (the Z axis direction). Thus, it is possible to prevent the formation of the area in which the stress in the plane direction in the inner structure 3 significantly reduces.

FIG. 14 shows a longitudinal cross-sectional view of the electrical connector 1. FIG. 15 shows a longitudinal cross-sectional view showing a state that the electrical connector 1 fits with the counterpart connector 100. When the counterpart connector 100 is inserted into the insertion port 211 of the shell 2 of the electrical connector 1 from the tip side of the electrical connector 1, the plurality of contacts 120 of the counterpart connector 100 respectively contact with the plurality of contacts 31 of the electrical connector 1 and thereby the electrical connection between the counterpart connector 100 and the electrical connector 1 is provided. At the same time, the shell contact portions 22 of the shell 2 of the electrical connector 1 contact with the outer periphery of the shell 110 of the counterpart connector 100 and the portions of the first ground plate 32L and the second ground plate 32R of the electrical connector 1 exposed to the outside through the openings 334 of the tongue portion 332 of the insulator 33 contact with the ground terminals of the counterpart connector 100. This makes it possible to make the ground potential of the electrical connector 1 equal to the ground potential of the electrical connector 1. Further, the tip end of the shell 110 of the counterpart connector 100 contacts with the shell stoppers 23 of the shell 2 of the electrical connector 1 and thereby the insertion movement of the counterpart connector 100 is restricted.

As described above, the first ground plate 32L and the second ground plate 32R are arranged so as to be separated from each other and the insulator 33 holds the first ground plate 32L and the second ground plate 32R so that the first ground plate 32L and the second ground plate 32R are insulated from each other in the electrical connector 1 of the present invention. Thus, it is possible to suppress the formation of the crosstalk between the two high frequency signal contact pairs CP1 of each of the first group 31U and the second group 31L constituted of the contacts 31 through the first ground plate 32L and the second ground plate 32R in the electrical connector 1 of the present invention.

Further, in the electrical connector 1 of the present invention, both of the first ground plate 32L and the second ground plate 32R include the extending portion extending from one of the first ground plate 32L and the second ground plate 32R toward the other one of the first ground plate 32L and the second ground plate 32R in the ground plane. Thus, it is possible to prevent the formation of the area in which the first ground plate 32L or the second ground plate 32R does not exist when the electrical connector 1 is viewed from the insertion direction of the counterpart connector 100 (the Z axis direction) even if the ground plate 32 is divided into the first ground plate 32L and the second ground plate 32R and the space is formed between the first ground plate 32L and the second ground plate 32R. Thus, it is possible to reduce the area in which the stress in the plane direction in the inner structure significantly reduces or prevent the formation of such an area. Therefore, it is possible to suppress the occurrence of the warpage and the bending of the inner structure 3 and thereby it is possible to suppress the occurrence of the connection failure between the counterpart connector 100 and the electrical connector 1 when the counterpart connector 100 is inserted into the electrical connector 1 from the tip side.

Further, in the electrical connector 1 of the present invention, the extending portions of the first ground plate 32L and the second ground plate 32R exist in the space between the first ground plate 32L and the second ground plate 32R. Thus, it is possible to suppress the occurrence of the warpage and the bending of the inner structure 3 in the space between the first ground plate 32L and the second ground plate 32R caused by the stress occurring when the insulation resin material is cooled and cured at the time of performing the insert molding for the insulator 33.

Further, in the electrical connector 1 of the present invention, the space 327 between the first ground plate 32L and the second ground plate 32R and defined by the extending portions of the first ground plate 32L and the second ground plate 32R is utilized for performing the tie bar cut for punching the connection portions of the plurality of contacts 31 to separate the plurality of contacts 31 from each other. Thus, it is possible to reduce the number of the tie bar cut holes 324 and the size of each of the tie bar cut holes 324 formed in the first ground plate 32L and the second ground plate 32R in the electrical connector 1 of the present invention. As a result, it is possible to suppress the occurrence of the warpage and the bending of the inner structure caused by the stress occurring when the insulation resin material is cooled and cured at the time of performing the insert molding for the insulator 33.

Although the electrical connector 1 of the present invention has been described based on the embodiment shown in the accompanying drawings in the above description, the scope of the present invention contains an electronic device including the electrical connector 1 as described above. The electronic device of the present invention contains a housing, a circuit board provided in the housing and the above-described electrical connector 1 mounted on the circuit board.

Although the electrical connector and the electronic device of the present invention have been described based on the embodiment shown in the accompanying drawing in the above description, the present invention is not limited thereto. The configuration of each component of the present invention may be possibly replaced with other arbitrary configurations having equivalent functions. Further, it may be also possible to add other arbitrary components to the configuration of the present invention.

Further, although the plurality of contacts 31 of the inner structure 3 constitute the first group 31U and the second group 31L facing each other through the tongue portion 332 of the insulator 33 and the first ground plate 32L and the second group 31L embedded in the tongue portion 332 in the electrical connector 1 of the present invention, the present invention is not limited thereto. For example, the scope of the present invention also contains the aspect in which the plurality of contacts 31 constitute only one of the first group 31U and the second group 31L and the aspect in which the plurality of contacts 31 constitute one or more additional group in addition to the first group 31U and the second group 31L.

A person having ordinary skills in the art and the technique pertaining to the present invention may modify the configuration of the electrical connector of the present invention described above without meaningfully departing from the principle, the spirit and the scope of the present invention and the electrical connector having the modified configuration is also contained in the scope of the present invention.

Further, the number and the kinds of the components of the electrical connector shown in FIGS. 4 to 15 are merely provided for the illustration of the present invention, the present invention is not necessarily limited thereto. The scope of the present invention contains alternations and changes of the described structures in which arbitrary constitutional components are added or combined or arbitrary constitutional components are omitted without meaningfully departing from the principle and the spirit of the present invention.

The invention claimed is:

1. An electrical connector which can fit with a counterpart connector inserted from a tip side of the electrical connector, comprising:

a plurality of contacts arranged in at least one plane;

a first ground plate and a second ground plate facing the plurality of contacts and arranged so as to be separated from each other along an insertion direction of the counterpart connector in a ground plane parallel to the at least one plane in which the plurality of contacts are arranged; and an insulator for holding the plurality of contacts, the first ground plate and the second ground plate in a state that the plurality of contacts, the first ground plate and the second ground plate are insulated from each other, wherein both of the first ground plate and the second ground plate have an extending portion extending from one to another of the first ground plate and the second ground plate in the ground plane, wherein at least two of the plurality of contacts are located between the first ground plate and the second ground plate in a planar view and separated from each other by a tie bar cut for punching a connection portion connecting the at least two of the plurality of contacts with each other, wherein a space through which the tie bar cut is performed with respect to the at least two of the plurality of contacts is defined between the first ground plate and the second ground plate by the extending portions of the first ground plate and the second ground plate, wherein tie bar cut marks of the at least two of the plurality of contacts formed by performing the tie bar cut with respect to the connection portion between the at least two of the plurality of contacts are located in the space defined between the first ground plate and the second ground plate by the extending portions of the first ground plate and the second ground plate in the planar view, and wherein the extending portion of the first ground plate and the extending portion of the second ground plate are at least partially overlapped with each other in the insertion direction of the counterpart connector.

2. The electrical connector as claimed in claim 1, wherein the extending portion of the first ground plate extends toward the second ground plate in the ground plane, and wherein the extending portion of the second ground plate extends toward the first ground plate in the ground plane.

3. The electrical connector as claimed in claim 1, wherein a distance between the first ground plate and the second ground plate at a location where the first ground plate and the second ground plate approach most to each other is equal to or more than a distance between the first ground plate or the second ground plate and each of the plurality of contacts at a location where the first ground plate or the second ground plate and each of the plurality of contacts approach most to each other.

4. The electrical connector as claimed in claim 1, wherein each of the first ground plate and the second ground plate includes a plate-like main body portion, wherein the first ground plate and the second ground plate are arranged so that the main body portion of the first ground plate and the main body portion of second ground plate are symmetric in the ground plane through a center line of the electrical connector in a width direction of the electrical connector perpendicular to the insertion direction of the counterpart connector.

5. The electrical connector as claimed in claim 1, wherein each of the first ground plate and the second ground plate includes:

positioning holes through which positioning pins are respectively passed for positioning each of the plurality of contacts when molding the insulator so that the insulator holds the plurality of contacts, the first ground plate and the second ground plate, tie bar cut holes for enabling the tie bar cut for punching connection portions of the plurality of contacts which are connected with each other by the connection portions when molding the insulator to separate the plurality of contacts from each other, and impedance adjustment holes for adjusting impedances of the plurality of contacts.

6. An electronic device, comprising:

a housing;

a circuit board provided in the housing; and the electrical connector defined by the claim 1 and mounted on the circuit board.

* * * * *